United States Patent
Shaw

(10) Patent No.: US 11,039,002 B2
(45) Date of Patent: *Jun. 15, 2021

(54) CONTEXT SENSITIVE COMMUNICATION AUGMENTATION

(71) Applicant: AT&T INTELLECTUAL PROPERTY I, L.P., Atlanta, GA (US)

(72) Inventor: Venson Shaw, Kirkland, WA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 295 days.

This patent is subject to a terminal disclaimer.

(21) Appl. No.: 16/132,189

(22) Filed: Sep. 14, 2018

(65) Prior Publication Data

US 2019/0014455 A1 Jan. 10, 2019

Related U.S. Application Data

(63) Continuation of application No. 14/732,631, filed on Jun. 5, 2015, now Pat. No. 10,129,706.

(51) Int. Cl.
*H04M 1/72454* (2021.01)
*H04W 4/021* (2018.01)
(Continued)

(52) U.S. Cl.
CPC ........ *H04M 1/72454* (2021.01); *H04L 67/12* (2013.01); *H04W 4/021* (2013.01); *H04W 4/30* (2018.02)

(58) Field of Classification Search
CPC ... H04M 1/72569; H04W 4/30; H04W 4/021; H04W 4/023; H04L 67/12; H04B 17/318; G01S 5/10; G01S 5/0249
See application file for complete search history.

(56) References Cited

U.S. PATENT DOCUMENTS

| | | | |
|---|---|---|---|
| 4,334,221 A | 6/1982 | Rosenhagen et al. |
| 4,829,565 A | 5/1989 | Goldberg |

(Continued)

FOREIGN PATENT DOCUMENTS

| | | |
|---|---|---|
| CA | 2 770 069 A1 | 2/2011 |
| EP | 0167625 A1 | 1/1986 |

(Continued)

OTHER PUBLICATIONS

Notice of Allowance dated Jun. 21, 2019 for U.S. Appl. No. 15/352,559, 21 pages.

(Continued)

*Primary Examiner* — Erin F Heard
*Assistant Examiner* — Donald HB Braswell
(74) *Attorney, Agent, or Firm* — Amin, Turocy & Watson, LLP

(57) ABSTRACT

Context sensitive communication augmentation is disclosed. A user equipment (UE) can receive a trigger related to determining a context of a UE. The trigger can be manual, automatic, or remote. In response to receiving the trigger, the context of the UE can be determined based on sensor data. The sensor data can be received from a sensor of the UE or another sensor. Based on the context of the UE, a metric related to a communication modality of the UE can be determined. The metric can be communicated to another device. Information related to the context of the UE, including location information, can be communicated to the other device. A communication modality can be selected based on the metric relate to the UE and communication modalities of the other device. The metric can be updated based on changes in the context of the UE, allowing for updating the communication modality.

20 Claims, 10 Drawing Sheets

(51) Int. Cl.
*H04W 4/30* (2018.01)
*H04L 29/08* (2006.01)

(56) References Cited

U.S. PATENT DOCUMENTS

| | | |
|---|---|---|
| 5,404,516 A | 4/1995 | Georgiades et al. |
| 5,905,461 A | 5/1999 | Neher |
| 6,085,216 A | 7/2000 | Huberrnan et al. |
| 6,226,622 B1 | 5/2001 | Dabbiere |
| 6,300,875 B1 | 10/2001 | Schafer |
| 6,356,841 B1 | 3/2002 | Hamrick et al. |
| 6,388,612 B1 | 5/2002 | Neher |
| 6,720,879 B2 | 4/2004 | Edwards |
| 6,813,498 B1 | 11/2004 | Durga et al. |
| 6,819,982 B2 | 11/2004 | Doane |
| 6,957,217 B2 | 10/2005 | Raverdy et al. |
| 6,985,810 B2 | 1/2006 | Moitra et al. |
| 7,099,921 B1 | 8/2006 | Engstrom et al. |
| 7,117,067 B2 | 10/2006 | Mclurkin et al. |
| 7,130,741 B2 | 10/2006 | Bodin et al. |
| 7,149,611 B2 | 12/2006 | Beck et al. |
| 7,203,502 B2 | 4/2007 | Wilson et al. |
| 7,236,858 B2 | 6/2007 | Carpenter et al. |
| 7,252,265 B2 | 8/2007 | Perlo et al. |
| 7,253,731 B2 | 8/2007 | Joao |
| 7,259,668 B2 | 8/2007 | Casey |
| 7,379,743 B2 | 5/2008 | Bostrom et al. |
| 7,492,251 B1 | 2/2009 | Katz |
| 7,551,126 B2 | 6/2009 | Loomis et al. |
| 7,551,577 B2 | 6/2009 | Mcrae |
| 7,583,632 B2 | 9/2009 | Janevski et al. |
| 7,602,302 B2 | 10/2009 | Hokuf et al. |
| 7,728,724 B1 | 6/2010 | Scalisi et al. |
| 7,830,305 B2 | 11/2010 | Boling et al. |
| 7,831,259 B2 | 11/2010 | Cao et al. |
| 7,844,364 B2 | 11/2010 | Mclurkin et al. |
| 7,990,264 B2 | 8/2011 | Chou |
| 8,035,510 B2 | 10/2011 | Pfafman et al. |
| 8,045,980 B2 | 10/2011 | Buckley et al. |
| 8,059,631 B2 | 11/2011 | Anto |
| 8,060,270 B2 | 11/2011 | Vian et al. |
| 8,073,467 B2 | 12/2011 | Gupta et al. |
| 8,160,606 B2 | 4/2012 | Shrivathsan et al. |
| 8,213,458 B2 | 7/2012 | Norby |
| 8,238,935 B2 | 8/2012 | Chen et al. |
| 8,255,470 B2 | 8/2012 | Jackson et al. |
| 8,260,485 B1 | 9/2012 | Meuth et al. |
| 8,275,352 B2 | 9/2012 | Forstall et al. |
| 3,290,513 A1 | 10/2012 | Forstall et al. |
| 8,301,158 B1 | 10/2012 | Thomas |
| 8,315,800 B2 | 11/2012 | Sanchez et al. |
| 8,315,905 B1 | 11/2012 | Adair |
| 8,364,170 B2 | 1/2013 | Lohtia et al. |
| 8,369,867 B2 | 2/2013 | Van Os et al. |
| 3,442,807 A1 | 5/2013 | Ramachandran |
| 8,439,301 B1 | 5/2013 | Lussier et al. |
| 8,442,005 B2 | 5/2013 | Dutta et al. |
| 8,442,483 B2 | 5/2013 | Gunasekara |
| 8,446,272 B2 | 5/2013 | Raduchel |
| 8,447,325 B2 | 5/2013 | Anakata et al. |
| 8,514,058 B2 | 8/2013 | Cameron |
| 8,521,328 B2 | 8/2013 | Jang |
| 8,531,294 B2 | 9/2013 | Slavin et al. |
| 8,558,694 B2 | 10/2013 | Brandt et al. |
| 8,559,925 B2 | 10/2013 | Zhang |
| 8,565,176 B2 | 10/2013 | Norlen et al. |
| 8,565,735 B2 | 10/2013 | Wohlwend et al. |
| 8,565,780 B2 | 10/2013 | Soelberg et al. |
| 8,589,488 B2 | 11/2013 | Huston et al. |
| 8,606,612 B2 | 12/2013 | de Silva et al. |
| 8,644,847 B1 | 2/2014 | Nelissen et al. |
| 8,649,774 B1 | 2/2014 | Zheng et al. |
| 8,665,089 B2 | 3/2014 | Saigh et al. |
| 8,676,406 B2 | 3/2014 | Coffman et al. |
| 8,686,852 B2 | 4/2014 | Ben-Dayan et al. |
| 8,700,659 B2 | 4/2014 | Skeen et al. |
| 8,725,165 B2 | 5/2014 | Lau et al. |
| 8,761,797 B1 | 6/2014 | Norton |
| 8,768,375 B2 | 7/2014 | Farmer |
| 8,768,555 B2 | 7/2014 | Duggan et al. |
| 8,787,318 B2 | 7/2014 | Pampu et al. |
| 8,788,121 B2 | 7/2014 | Klinger |
| 8,799,476 B2 | 8/2014 | Karaoguz et al. |
| 8,817,707 B2 | 8/2014 | Gupta |
| 8,824,439 B2 | 9/2014 | Jiang et al. |
| 8,825,084 B2 | 9/2014 | Hymel et al. |
| 8,827,206 B2 | 9/2014 | Van Speybroeck et al. |
| 8,831,577 B2 | 9/2014 | Ginn et al. |
| 8,838,566 B2 | 9/2014 | Vaananen |
| 8,849,310 B2 | 9/2014 | Fan et al. |
| 8,886,584 B1 | 11/2014 | Kane, Jr. et al. |
| 8,903,426 B2 | 12/2014 | Tholkes et al. |
| 8,918,075 B2 | 12/2014 | Maier et al. |
| 8,924,250 B2 | 12/2014 | Bates et al. |
| 8,958,928 B2 | 2/2015 | Seydoux et al. |
| 8,965,598 B2 | 2/2015 | Kruglick |
| 8,989,773 B2 | 3/2015 | Sandel et al. |
| 9,258,761 B2 | 2/2016 | Bertrand et al. |
| 9,456,298 B2 | 9/2016 | Lee et al. |
| 9,524,648 B1 | 12/2016 | Gopalakrishnan et al. |
| 9,629,076 B2 | 4/2017 | Shaw et al. |
| 9,936,010 B1 | 4/2018 | Robbins et al. |
| 9,961,625 B2 | 5/2018 | Shaw et al. |
| 2002/0161862 A1 | 10/2002 | Horvitz |
| 2003/0114171 A1 | 6/2003 | Miyamoto |
| 2004/0030571 A1 | 2/2004 | Solomon |
| 2004/0073784 A1 | 4/2004 | Ishidoshiro |
| 2004/0185875 A1 | 9/2004 | Diacakis et al. |
| 2005/0048918 A1 | 3/2005 | Frost et al. |
| 2005/0105496 A1 | 5/2005 | Ambrosino |
| 2006/0114324 A1 | 6/2006 | Farmer et al. |
| 2007/0146199 A1 | 6/2007 | Huang et al. |
| 2007/0171818 A1 | 7/2007 | Shoji et al. |
| 2007/0214073 A1 | 9/2007 | Smith |
| 2007/0284474 A1 | 12/2007 | Olson et al. |
| 2008/0032703 A1 | 2/2008 | Krumm et al. |
| 2008/0135687 A1 | 6/2008 | Penzo |
| 2008/0144884 A1 | 6/2008 | Habibi |
| 2008/0153511 A1 | 6/2008 | Mock |
| 2008/0194273 A1 | 8/2008 | Kansal et al. |
| 2008/0262717 A1 | 10/2008 | Ettinger |
| 2009/0086973 A1 | 4/2009 | Buddhikot et al. |
| 2009/0156231 A1 | 6/2009 | Versteeg et al. |
| 2009/0215469 A1 | 8/2009 | Fisher et al. |
| 2009/0219393 A1 | 9/2009 | Vian et al. |
| 2009/0248587 A1 | 10/2009 | Van Buskirk |
| 2009/0315704 A1 | 12/2009 | Rosing et al. |
| 2010/0024045 A1 | 1/2010 | Sastry et al. |
| 2010/0217525 A1 | 8/2010 | King et al. |
| 2010/0240370 A1 | 9/2010 | Pandit et al. |
| 2010/0250022 A1 | 9/2010 | Hines et al. |
| 2011/0035284 A1 | 2/2011 | Moshfeghi |
| 2011/0053605 A1 | 3/2011 | Carpio et al. |
| 2011/0072101 A1 | 3/2011 | Forsell et al. |
| 2011/0083101 A1 | 4/2011 | Sharon et al. |
| 2011/0090870 A1 | 4/2011 | Ronneke et al. |
| 2011/0105143 A1 | 5/2011 | Harple et al. |
| 2011/0176424 A1 | 7/2011 | Yang et al. |
| 2011/0196912 A1 | 8/2011 | Payton et al. |
| 2011/0207440 A1 | 8/2011 | Ruuspakka et al. |
| 2011/0234399 A1 | 9/2011 | Yan |
| 2011/0238476 A1 | 9/2011 | Carr et al. |
| 2011/0258049 A1 | 10/2011 | Ramer et al. |
| 2011/0295677 A1 | 12/2011 | Dhingra et al. |
| 2011/0301784 A1 | 12/2011 | Oakley et al. |
| 2012/0004791 A1 | 1/2012 | Buelthoff et al. |
| 2012/0029731 A1 | 2/2012 | Waldock et al. |
| 2012/0058762 A1 | 3/2012 | Buckley et al. |
| 2012/0101818 A1 | 4/2012 | Scott et al. |
| 2012/0233067 A1 | 9/2012 | Matthew et al. |
| 2012/0265841 A1 | 10/2012 | Ross et al. |
| 2012/0271684 A1 | 10/2012 | Shutter |
| 2012/0284100 A1 | 11/2012 | Goldberg |
| 2012/0290336 A1 | 11/2012 | Rosenblatt et al. |

(56) References Cited

U.S. PATENT DOCUMENTS

| | | |
|---|---|---|
| 2013/0013412 A1 | 1/2013 | Altman et al. |
| 2013/0034019 A1 | 2/2013 | Mustajarvi |
| 2013/0039353 A1 | 2/2013 | Franco et al. |
| 2013/0060640 A1 | 3/2013 | Gadhia et al. |
| 2013/0070641 A1 | 3/2013 | Meier et al. |
| 2013/0077482 A1 | 3/2013 | Krishna et al. |
| 2013/0090980 A1 | 4/2013 | Hummel |
| 2013/0107702 A1 | 5/2013 | Gupta et al. |
| 2013/0109302 A1* | 5/2013 | Levien ............... H04M 7/0024 455/39 |
| 2013/0128815 A1 | 5/2013 | Scherzer et al. |
| 2013/0137423 A1 | 5/2013 | Das et al. |
| 2013/0142056 A1* | 6/2013 | Abplanalp ............. H04W 4/08 370/252 |
| 2013/0155849 A1 | 6/2013 | Koodli et al. |
| 2013/0155851 A1 | 6/2013 | Koodli et al. |
| 2013/0165120 A1 | 6/2013 | Nylander et al. |
| 2013/0166103 A1 | 6/2013 | Ko |
| 2013/0198397 A1* | 8/2013 | Zhang ............... H04L 65/1089 709/228 |
| 2013/0198817 A1 | 8/2013 | Haddad et al. |
| 2013/0208693 A1 | 8/2013 | De La Forest Divonne et al. |
| 2013/0210385 A1 | 8/2013 | Ahmed et al. |
| 2013/0214925 A1 | 8/2013 | Weiss |
| 2013/0225161 A1 | 8/2013 | Chhabra et al. |
| 2013/0259020 A1 | 10/2013 | Ullah et al. |
| 2013/0304257 A1 | 11/2013 | Wang et al. |
| 2013/0304578 A1 | 11/2013 | Kannan et al. |
| 2013/0308622 A1 | 11/2013 | Uhlik |
| 2013/0332527 A1 | 12/2013 | Du et al. |
| 2013/0333016 A1 | 12/2013 | Coughlin et al. |
| 2013/0340013 A1 | 12/2013 | Chadha |
| 2014/0004854 A1 | 1/2014 | Veran et al. |
| 2014/0006069 A1 | 1/2014 | Guggenheim |
| 2014/0018976 A1 | 1/2014 | Goossen |
| 2014/0019248 A1 | 1/2014 | Stoliartchouk et al. |
| 2014/0023059 A1 | 1/2014 | Gupta |
| 2014/0025233 A1 | 1/2014 | Levien et al. |
| 2014/0032034 A1 | 1/2014 | Raptopoulos et al. |
| 2014/0046802 A1 | 2/2014 | Hosein et al. |
| 2014/0074604 A1 | 3/2014 | Castillo et al. |
| 2014/0081479 A1 | 3/2014 | Vian et al. |
| 2014/0092886 A1 | 4/2014 | Gupta |
| 2014/0094195 A1 | 4/2014 | Luo et al. |
| 2014/0106743 A1 | 4/2014 | Ferraro Esparza et al. |
| 2014/0122040 A1 | 5/2014 | Marti |
| 2014/0126360 A1 | 5/2014 | Rong et al. |
| 2014/0126532 A1 | 5/2014 | Bapat et al. |
| 2014/0140575 A1 | 5/2014 | Wolf |
| 2014/0171024 A1 | 6/2014 | Huang et al. |
| 2014/0213295 A1 | 6/2014 | Conklin |
| 2014/0187252 A1 | 7/2014 | Gupta et al. |
| 2014/0192643 A1 | 7/2014 | Kalapatapu et al. |
| 2014/0200749 A1 | 7/2014 | Spilsbury |
| 2014/0206349 A1 | 7/2014 | Bertrand et al. |
| 2014/0206353 A1 | 7/2014 | Kim et al. |
| 2014/0206439 A1 | 7/2014 | Bertrand et al. |
| 2014/0222562 A1 | 8/2014 | Akgul et al. |
| 2014/0241333 A1 | 8/2014 | Kim et al. |
| 2014/0254434 A1 | 9/2014 | Jain et al. |
| 2014/0254435 A1 | 9/2014 | Menendez et al. |
| 2014/0254478 A1 | 9/2014 | Deshpande et al. |
| 2014/0269654 A1 | 9/2014 | Canpolat et al. |
| 2014/0279014 A1 | 9/2014 | Roka et al. |
| 2014/0312165 A1 | 10/2014 | Mkrtchyan |
| 2014/0341076 A1 | 11/2014 | Orlandi et al. |
| 2014/0378162 A1 | 12/2014 | Shatsky et al. |
| 2015/0011241 A1 | 1/2015 | Papakipos et al. |
| 2015/0017943 A1 | 1/2015 | Mitchell et al. |
| 2015/0020147 A1 | 1/2015 | Krishnan et al. |
| 2015/0065164 A1 | 3/2015 | Hoseinitabatabaei et al. |
| 2015/0066248 A1 | 3/2015 | Arbeit et al. |
| 2015/0101503 A1 | 4/2015 | Brown |
| 2015/0120094 A1 | 4/2015 | Kimchi et al. |
| 2015/0195759 A1 | 7/2015 | Sirotkin et al. |
| 2015/0195858 A1 | 7/2015 | Jin et al. |
| 2015/0223115 A1 | 8/2015 | Liang et al. |
| 2015/0236778 A1 | 8/2015 | Jalali |
| 2015/0264123 A1 | 9/2015 | Smadi et al. |
| 2015/0282058 A1 | 10/2015 | Forssell |
| 2015/0288797 A1 | 10/2015 | Vincent |
| 2015/0304885 A1 | 10/2015 | Jalali |
| 2015/0312808 A1 | 10/2015 | Kiss |
| 2015/0319102 A1 | 11/2015 | Esdaile et al. |
| 2015/0327067 A1 | 11/2015 | Shen et al. |
| 2015/0327136 A1 | 11/2015 | Kin et al. |
| 2015/0365351 A1 | 12/2015 | Suit |
| 2015/0373579 A1 | 12/2015 | Xu et al. |
| 2016/0035224 A1 | 2/2016 | Yang et al. |
| 2016/0035343 A1 | 2/2016 | Tang et al. |
| 2016/0050012 A1 | 2/2016 | Frolov et al. |
| 2016/0111006 A1 | 4/2016 | Srivastava et al. |
| 2016/0117355 A1 | 4/2016 | Krishnamurthy |
| 2016/0142884 A1 | 5/2016 | Sears |
| 2016/0253710 A1 | 9/2016 | Publicover et al. |
| 2016/0293018 A1 | 10/2016 | Kim et al. |
| 2016/0307449 A1 | 10/2016 | Gordon et al. |
| 2016/0337504 A1* | 11/2016 | Gilbert ................. H04W 24/02 |
| 2017/0323235 A1 | 11/2017 | Johnston et al. |
| 2018/0074520 A1 | 3/2018 | Liu et al. |
| 2018/0206110 A1 | 7/2018 | Chaki et al. |

FOREIGN PATENT DOCUMENTS

| | | |
|---|---|---|
| EP | 0687626 A1 | 12/1995 |
| EP | 2706790 A1 | 3/2014 |
| GB | 2231220 A | 11/1990 |
| GB | 2473825 A | 3/2011 |
| WO | 03/060847 A1 | 7/2003 |
| WO | 2007/004999 A1 | 1/2007 |
| WO | 2010064548 A1 | 6/2010 |
| WO | 2012/148657 A1 | 11/2012 |
| WO | 2013039573 A2 | 3/2013 |
| WO | 2013134669 | 9/2013 |
| WO | 2013163746 | 11/2013 |

OTHER PUBLICATIONS

Final Office Action dated Feb. 25, 2019 for U.S. Appl. 15/352,559, 30 pgs.
Office Action dated May 23, 2019 for U.S. Appl. No. 15/944,733, 48 pgs.
Spot, "Spot Ready for Adventure", URL: http://findmespot.com/en/index.php?cid=129, Spot Trace Serсices, Mar. 12, 2015, 1 page.
IOS 7, "Understanding Location Services", URL : https://support.apple.com/en-us/HT201357, Apple, support.apple.com, Mar. 12, 2015, 3 pages.
GPS, "Broadcom", URL : http://www.broadcom.com/products/GPS,Broadcom.com, Mar. 12, 2015, 1 page.
Google, "Enable Android location access", URL : https://support.google.com/coordinate/answer/2569281?hl=en, Support.Google.Com, Mar. 12, 2015, 2 pages.
About T-Mobile, "T-Mobile", URL : http://www.t-mobile.com/company/privacyresources.aspxtp=Abt_Tab_LocationServices, Mar. 12, 2015, 2 pages.
Emergency Beacons, NOAA: Search and Rescue Satellite Aided Tracking, http://www.sarsat.noaa.gov/emerbcns.html, Sarsat.Noaaa.Gov, Mar. 12, 2015, 2 pages.
Spyguy Security, "Outlander Real-Time GPS Tracker", URL : http://www.spyguysecurity.com/collections/gps-tracking/products/outlander-portable-real-time-gps-tracker, www.spyguysecurity.com, Mar. 13, 2015, 3 pages.
GPS Tracker, "Micro Tracker", URL : http://shop.spy-spot.com/gps-tracker, Spy Spot Investigation, shop.spy-spot.com, Mar. 13, 2015, 1 page.
Lightning GPS, "The Only Choice to Protect Your Business Assets", URL : http://www.lightninggps.com/gps_asset_tracking/, lightninggps.com, Mar. 13, 2015, 2 pages.
Steinfield, Charles, "The Development of Location Based Services in Mobile Commerce", URL http://link.springer.com/chapter/10.1007/978-3-662-11659-3_10, E-Life after the Dot Corn Bust, Physica-Verlag HD, 2004, pp. 1-15.

(56) References Cited

OTHER PUBLICATIONS

Screenmedia Daily, "Free Trend Report: Why Location Is the New Currency of Marketing", URL : http://screenmediadaily.com/free-trend-report-why-location-is-the-new-currencyof-marketing/ ,screenmediadaily.com, Mar. 14, 2015, 8 pages.
Georgiev et al., "Where Businesses Thrive: Predicting the Impact of the Olympic Games on Local Retailers through Location-based Services Data", Mar. 29, 2014, 11 pages.
Dilmener et al., "Location Based Sales Promotion Strategies", International Conference on Marketing & Consumer Behavior, 2013, 13 pages.
Non-Final Office Action received for U.S. Appl. No. 14/817,800 dated Dec. 28, 2016, 27 pages.
Final Office Action received for U.S. Appl. No. 14/817,800 dated Jun. 14, 2017, 15 pages.
Non-Final Office Action received for U.S. Appl. No. 14/817,859 dated Dec. 26, 2017, 40 pages.
Non-Final Office Action received for U.S. Appl. No. 14/824,746 dated Mar. 19, 2018, 30 pages.
Final Office Action received for U.S. Appl. No. 14/817,859 dated Apr. 30, 2018, 32 pages.
Final Office Action received for U.S. Appl. No. 14/824,746 dated Aug. 24, 2018, 84 pages.
Non-Final Office Action received for U.S. Appl. No. 14/817,859 dated Oct. 3, 2018, 30 pages.
Non-Final Office Action received for U.S. Appl. No. 15/901,661 dated Sep. 14, 2018, 22 pages.
Final Office Action received for U.S. Appl. No. 14/817,859 dated Jan. 31, 2019, 26 pages.
Non-Final Office Action received for U.S. Appl. No. 14/817,859 dated Aug. 9, 2019, 27 pages.
Notice of Allowance received for U.S. Appl. No. 14/824,746 dated Jun. 12, 2019, 40 pages.
Final Office Action received for U.S. Appl. No. 14/817,859 dated Dec. 2, 2019, 36 pages.
Boddhu, et al. "A collaborative smartphone sensing platform for detecting and tracking hostile drones", Ground/Air Multisensor Interoperability, Integration, and Networking for Persistent ISR IV, Proc. of SPIE vol. 8742, 874211. May 22, 2013. 11 pages.
Quaritsch, et al., "Collaborative Microdrones: Applications and Research Challenges", Autonomics 2008, Sep. 23-25, 2008, Turin, Italy. 7 pages.
Nova, et al., "The impacts of awareness tools on mutual modelling in a collaborative video-game", Groupware: Design, Implementation, and Use. vol. 2806 of the series Lecture Notes in Computer Science. Springer Berlin Heidelberg, 2003. 13 pages.
Choi, et al., "Collaborative Tracking Control of UAV-UGV", World Academy of Science, Engineering and Technology, International Scholarly and Scientific Research & Innovation, vol. 6, No. 11, 2012. 4 pages.
Zhao, Yilin. "Standardization of mobile phone positioning for 3G systems" IEEE Communications Magazine, Jul. 2002, 9 pages.
Paredes, et al. "SOSPhone: a mobile application for emergency calls", Universal Access in the Information Society Aug. 2014, vol. 13, Issue 3, 14 pages.
D'Roza, et al, "An Overview of Location-Based Services", BT Technology Journal, Jan. 2003, vol. 21, Issue 1, 8 pages.
Arminen, Ilkka. "Social functions of location in mobile telephony", Personal and Ubiquitous Computing, Aug. 2006, 5 pages.
Non-Final Office Action for U.S. Appl. No. 14/732,631 dated Apr. 28, 2016, 35 pages.
Office Action dated Aug. 4, 2016 for U.S. Appl. No. 14/530,593, 34 pages.
Office Action dated Sep. 21, 2016 for U.S. Appl. No. 14/732,631, 40 pages.
Morgenthaler, Simon, et al. "UAVNet: A mobile wireless mesh network using unmanned aerial vehicles." 2012 IEEE Globecom Workshops. IEEE, 2012. Retrieved on Aug. 26, 2016. 6 pages.
Di Felice, Marco, et al. "Self-organizing aerial mesh networks for emergency communication." 2014 IEEE 25th Annual International Symposium on Personal, Indoor, and Mobile Radio Communication (PIMRC). IEEE, 2014. Retrieved on Aug. 26, 2016. 6 pages.
Office Action dated Feb. 3, 2017 for U.S. Appl. No. 14/732,626, 125 pages.
Joseph, et al., "Interoperability of WiFi Hotspots and Cellular Networks", Proceedings of the 2nd ACM International Workshop on Wireless mobile applications and services in WLAN hotspots, Oct. 2004, 10 pages.
Li, et al., "Context-Aware Handoff on Smartphones", 2013 IEEE 10th International Conference on Mobile Ad-Hoc and Sensor Systems, Oct. 2013, 9 pages.
Tawil, et al., "Distributed Handoff Decision Scheme using MIH Function for the Fourth Generation Wireless Networks", 2008 3rd International Conference on Information and Communication Technologies: From Theory to Applications, Apr. 2008, 6 pages.
Taleb, et al., "On the Design of Energy-Aware 3G/WiFi Heterogeneous Networks under Realistic Conditions," 2013 27th International Conference on Advanced Information Networking and Applications Workshops, Mar. 2013, 5 pages.
Lee, et al, "Economics of WiFi offloading: Trading delay for cellular capacity", IEEE Transactions on Wireless Communications, vol. 13, No. 3, Mar. 2014, 15 pages.
Kotwal, et al. "Seamless Handoff between IEEE 802.11 and GPRS Networks", Distributed Computing and Internet Technology—Lecture Notes in Computer Science, Proceedings of the 6th International Conference, ICDCIT 2010, Feb. 2010, 7 pages.
Pyattaev, et al, "3GPP LTE traffic offloading onto WiFi Direct", IEEE Wireless Communications and Networking Conference Workshops, Apr. 2013, 6 pages.
Yang, et al, "A Performance Evaluation of Cellular/WLAN Integrated Networks," Fourth International Symposium on Parallel Architectures, Algorithms and Programming, Dec. 2011, 5 pages.
Bennis, et al, "When cellular meets WiFi in wireless small cell networks," IEEE Communications Magazine, Jun. 2013, vol. 51, Issue 6, 7 pages.
Melzer, et al, "Securing WLAN offload of cellular networks using subscriber residential access gateways," IEEE International Conference on Consumer Electronics, Jan. 2011, 2 pages.
Non-Final Office Action for U.S. Appl. No. 14/549,119, dated Jul. 14, 2016, 21 pages.
Office Action dated May 18, 2017 for U.S. Appl. No. 14/732,631, 51 pages.
Office Action dated Jun. 27, 2017 for U.S. Appl. No. 14/732,626, 15 pages.
Office Action dated Nov. 13, 2017 for U.S. Appl. No. 14/732,631, 51 pages.
Office Action dated Jan. 10, 2018 for U.S. Appl. No. 15/476,956, 35 pages.
Office Action dated Jan. 04, 2018 for U.S. Appl. No. 14/732,626, 28 pages.
Baxter, et al., "Scheduling UAV Surveillance Tasks, Lessons Learnt from Trials with Users," IEEE International Conference on Systems, Man, and Cybernetics, 2013. 5 pages.
Office Action dated Aug. 8, 2017 for U.S. Appl. No. 15/480,341, 39 pages.
Notice of Allowance dated Jun. 14, 2018 for U.S. Appl. No. 14/732,631, 38 pages.
Office Action dated Sep. 5, 2018 for U.S. Appl. No. 15/352,559, 60 pages.
Non-Final Office Action received for U.S. Appl. No. 16/582,924 dated Aug. 6, 2020, 61 pages.
Office Action dated Mar. 2, 2021 for U.S. Appl. No. 16/177,270, 79 pages.

\* cited by examiner

CONTEXT SENSITIVE COMMUNICATION AUGMENTATION

RELATED APPLICATION

The subject application is a continuation of, and claims priority to, U.S. patent application Ser. No. 14/732,631, filed 5 Jun. 2015, and entitled "CONTEXT SENSITIVE COMMUNICATION AUGMENTATION," the entirety of which application is hereby incorporated by reference herein.

TECHNICAL FIELD

The disclosed subject matter relates to augmentation of communication, including augmentation of a communication modality between a user equipment and a service interface.

BACKGROUND

By way of brief background, conventional communications modality selection is generally limited to occurring prior to establishing communication. As an example, a user can place voice call and reasonably expect that that communication will be a voice communication. Similarly, a multimedia communication can be initiated with the expectation that that communication will remain multimedia. While some conventional systems employ failover mechanisms, such as reverting to voice only when network issues prevent communication of richer multimedia information in a communication session, these failover mechanisms are generally not considered context sensitive.

DETAILED DESCRIPTION

Figure 1:
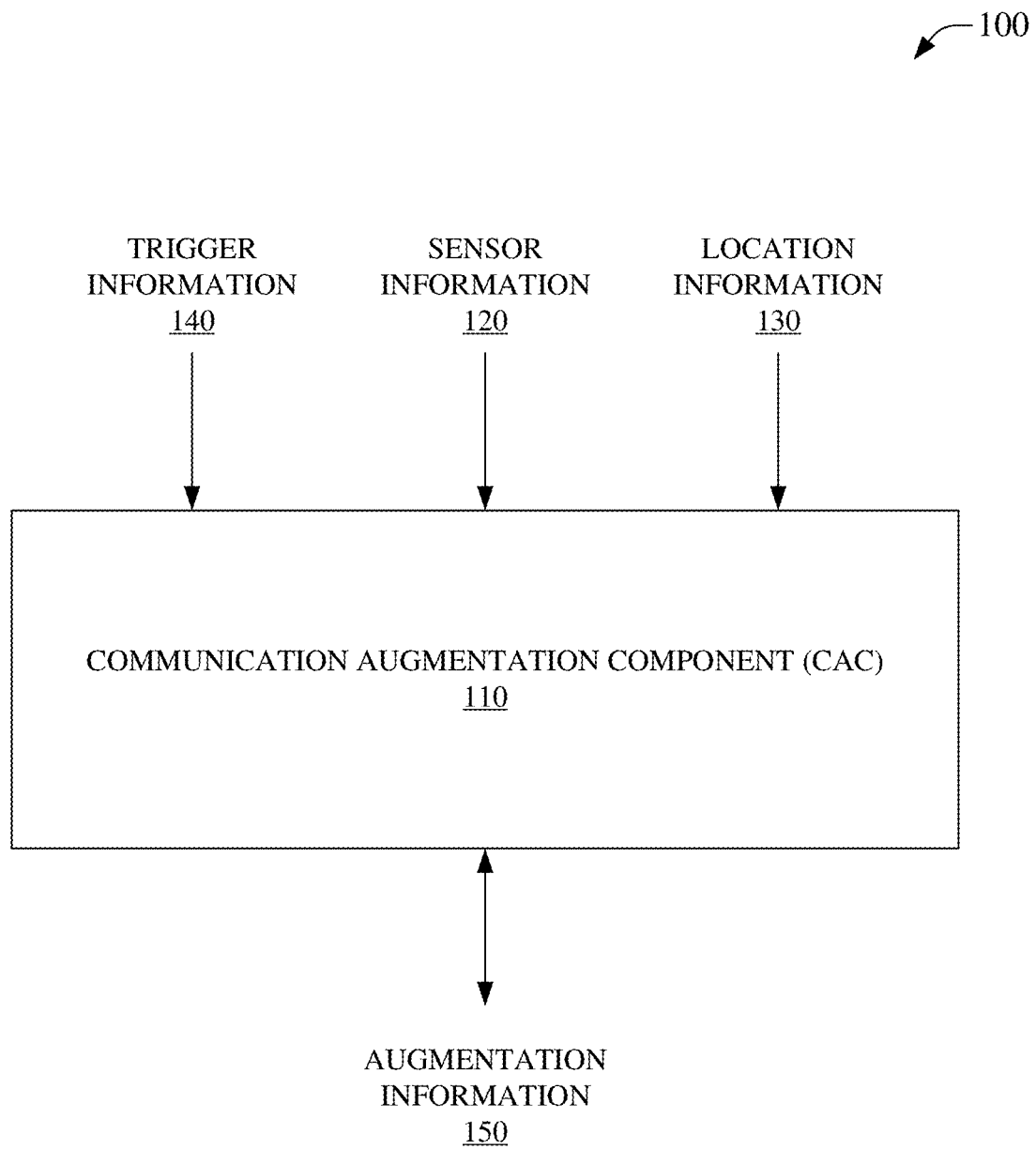
FIG. 1 is an illustration of an example system that facilitates context sensitive communication augmentation in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional communications modality selection is generally limited to occurring prior to establishing communication. As an example, a user can place voice call and reasonably expect that that communication will be a voice communication. Similarly, a multimedia communication can be initiated with the expectation that that communication will remain multimedia. While some conventional systems employ failover mechanisms, such as reverting to voice only when network issues prevent communication of richer multimedia information in a communication session, these failover mechanisms are generally not considered context sensitive. Moreover, many systems communicate location information, but generally do not employ that location information in augmenting a communication modality in a communication session. Moreover, inclusion of automatic context analysis is typically not encountered in communication session modality selection and modality updates.

The instant disclosure relates to, among other aspects, context sensitive communication augmentation that can intelligently select and adapt communication modalities based on the context related to a communication session. Context sensitive communication augmentation extends beyond mere failover mechanisms to provide automatic and intelligent augmentation, e.g., selection, modification, and adaptation, of a communication modality, hereinafter a 'modality' or a similar term, of a communication session, hereinafter a 'session' or a similar term. Moreover, where context sensing is employed, in an aspect, triggering of a communications session, along with communication augmentation, can be automated. With the expanding number of sensors associated with user devices, e.g., mobile phones, wearable computing, smart objects, tablets, vehicles, etc., the ability to capture a context and leverage that context to enable communication augmentation continues to increase.

In an aspect, a trigger can be associated with capturing contextual information from sensors and leveraging that context to augment communication. Augmenting communication can include determining a mode of communication based on the context, as an example, where a phone is in a noisy environment, text messaging can be selected over voice communication to improve the likelihood of successful communication. Further, context information and the determined mode of communication can be made available to a device associated with the target of the communication. As an example, when communicating with an emergency service, e.g., 9-1-1, a UE context and location can be shared with a device of the emergency service, e.g., a service interface component, to facilitate communications in the determined modality. Further, where the determined modality is not supported, other modalities can be selected based on a ranking of available modalities for the UE and the service interface component in an intelligent and automatic manner. As an example, a 9-1-1 call placed from a noisy environment can determine text messaging is highly ranked. A request for text messaging can be sent, along with location information, to the 9-1-1 service interface component, which can determine if text messaging is supported by 9-1-1 services. Where it is supported, the communication can proceed via text message. Where it is not supported, another modality that is supported by 9-1-1 and the UE can be selected based on availability and ranking of the alternate modalities. Moreover, additional context and/or sensor data can be communicated to the 9-1-1 service interface component as part of the communication, such as captured audio, video, motion, location, orientation, acceleration, temperature, pressure, direction of travel, or other information associated with sensors of the UE or those in communication with the UE. Examples of sensors that can provide other context information from being in communication with the UE can be health history, blood pressure, heart rate, blood oxygen saturation, carbon monoxide detection, smoke detection, ionized particle detection, gunshot triangulation, etc.

In an aspect, triggering can be manual, automatic, or remotely controlled. Manual triggering can be associated with manually beginning a communication session, e.g., making a call, starting a video chat, texting, activating an application, etc. Automatic triggering can be associated with initiating context sensitive communication augmentation based on automatically detected events, e.g., an incoming call, a drop in heart rate via a wearable device, sounds of distress, rapid changes in position or acceleration, such as from a car accident, security system alerts and or alarms, carbon monoxide and/or smoke/ion detector alerts/alarms, power failures/interruption, such as to medical equipment, etc., alerts from implantable devices, such as pacemakers, etc. Remote triggering can be associated with initiating context sensitive communication augmentation based on remote triggers, such as, Amber alerts, emergency broadcasts, lahar/tsunami warning systems, via authorized third parties such as a parent, spouse, law enforcement, etc. Triggering context sensitive communication augmentation can enable a subsequent communication to be performed on an available modality that is preferred in a given context and can enable communication of location and other context information to related devices to supplement other systems related to the communication.

In an aspect, where many modern service interfaces, such as call routing systems, are increasingly prevalent, context information can enable rapid traversal of these service interfaces. Context and supplementary information, such as from a user profile, can aid in populating parameters associated with a service interface. This can enable selection of preferred communication modalities, communication of location information, and aid in traversing service interface schema. As an example, if a user has a heart attack and is wearing a smartwatch that monitors heart activity, the heart attack can be an automatic trigger to begin a call to 9-1-1. A speakerphone and video communication modality can be selected to allow a 9-1-1 operator to see and attempt to talk to the victim of the heart attack rather than requiring the victim to hold the phone to their ear. Additionally, the 9-1-1 service interface can route the call to a medical dispatcher rather than a police dispatcher based on the heart attack context information related via the disclosed technology. Moreover, location information can be communicated to allow dispatch of emergency medical services (EMS). A medical history can be made accessible to allow EMS to have this information in route to the victim. Additionally, where the victim begins to type responses to the 9-1-1 operator, perhaps due to an inability to speak, a text messaging modality can be activated such that the victim can type messages to, but hear the 9-1-1 operator, while the 9-1-1 operator can see, via video, and speak to the victim and receive incoming text messages from the victim.

As another example, a voice call can be made to a bank. Initiation of the call by the user can trigger context sensitive communication augmentation, such that the voice mode is selected for the call. Further, the location information can be sent to aid the bank in verifying the user to their account. Moreover, account information can be communicated, e.g., from a user profile, to aid in traversing the bank's service interface and routing the call to an account representative at the bank. Where the caller subsequently transitions into a noisy environment wherein conducting a voice call is problematic, context sensitive communication augmentation can adapt the communication modality to an instant message mode allowing the communication to continue without the difficulty of voice communication in a noisy environment.

In an embodiment, a system can comprise a processor and a memory allowing execution of stored instructions to enable the processor to receive trigger information related to determining an augmentation of a communication modality. The processor can determine context information related to a user equipment in response to the receiving the trigger information, wherein the determining the context information is based on sensor data related to a context of the user equipment. Communication modality information based on the context information can be determined. The processor can enable access to the determined communication modality information and at least a portion of the context information.

In another embodiment, a method can comprise receiving, by a system comprising a processor, a trigger related to initiating determining an augmentation of a communication modality between a user equipment and another device. The system can further determine context information related to the user equipment in response to the receiving the trigger, wherein the context information is based on sensor data related to a context of the user equipment. The system can determine a rank score related to a communication modality of the user equipment based on the context information and facilitate access to the rank score for the other device via a network.

In a further embodiment, a computer readable medium can comprise instructions that can cause a system comprising a processor to determine an occurrence of a trigger event related to determining augmentation of a communication modality between a user equipment and another device. The processor can determine context information related to the user equipment in response to the occurrence of the trigger, wherein the context information is based on sensor data related to an environment of the user equipment. The processor can further determine a communication modality of the user equipment based on the context information and enable access to information related to the communication modality for the other device via a network.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates context sensitive communication augmentation in accordance with aspects of the subject disclosure. System 100 can include communication augmentation component (CAC) 110 that can intelligently select and adapt communication modalities based on the context related to a communication session. CAC 110 can adapt communication modalities to provide automatic and intelligent augmentation, e.g., selection, modification, and adaptation, of a communication modality of a communication session. CAC 110 can receive sensor information 120 and location information 130. CAC 110 can determine a context based on the sensor and location information, e.g., 120 and 130. This determined context can be employed in selecting and/or modifying a communication modality for a communication session. In an embodiment, communication augmentation can include selecting a preferred communication modality, such as from communication modalities associated with a communication device like a smartphone, tablet computer, wearable device, laptop, vehicle computer, etc. As an example, based on sensor and location information 120 and 130, CAC 110 can determine that a communication session is related to a user in a moving vehicle and can determine that an audio-video (AV) modality is preferential to a texting modality. As such, in this example, when the communication session begins, it can be performed via an AV modality. In some embodiments, communication augmentation can comprise adapting or modifying a communication modality for a communication session in progress. As an example, where a communication session has begun in a moving vehicle in an AV modality and where the context changes to the user leaving the vehicle, CAC 110 can determine that another modality is preferential to the AV modality and can facilitate changing the modality for the communication session. As such, the AV modality can be switched to a texting modality where the user leaves the vehicle into a noisy environment where a voice modality or AV modality would be less preferred.

Trigger information 140 can be received by CAC 110, which can be employed to initiate determination of a preferred communication modality by CAC 110. Trigger information 140 can be received in response to manual, automatic, or remote triggering or triggering rules. Manal triggering can be associated with initiating a call, text message, AV message, etc., activating an application such as on a smartphone or tablet computer, etc., selecting a 'help' function, via a user interface (UI), etc., or nearly any other form of manually triggering CAC 110 functionality.

In an aspect, where context sensing via sensor information 120 is employed, e.g., receiving sensor information 120 and/or location information 130 in the background, triggering of a communications session, along with communication augmentation, can be automated. As an example, where a smartphone monitors audio and captures a user saying "help me," this can automatically trigger CAC 110 to determine a preferred communication modality based on sensor information 120 and location information 130. With the expanding number of sensors associated with user devices, e.g., mobile phones, wearable computing, smart objects, tablets, vehicles, etc., the ability to capture a context and leverage that context to enable communication augmentation continues to increase. In an aspect, a trigger can be associated with capturing contextual information from sensors and leveraging that context to augment communication. Augmenting communication can include determining a mode of communication based on the context, as an example, where a phone is in a noisy environment, text messaging can be selected over voice communication to improve the likelihood of successful communication.

CAC 110 can generate augmentation information 150, e.g., the determined mode of communication, which can be made available to a device associated with a target of the communication. Augmentation information 150 can be employed by the target to determine compatibility with the determined mode of communication and/or negotiate other available modes of communication. A service interface component, e.g., a component of systems related to the target, can therefore facilitate communications in the determined modality or, where the determined modality is not supported, other modalities can be selected based on a ranking of available modalities for the UE and the service interface component, in an intelligent and automatic manner. Moreover, additional context and/or sensor data can be communicated to service interface component as part of the communication from CAC 110, e.g., via augmentation information 150, such as captured audio, video, motion, location, orientation, acceleration, temperature, pressure, direction of travel, or other information associated with sensors of the UE or those in communication with the UE. Sensors can provide additional context information such as health history, blood pressure, heart rate, blood oxygen saturation, carbon monoxide detection, smoke detection, ionized particle detection, gunshot triangulation, etc., via other sensors in communication with the UE and/or associated profiles, etc.

In an aspect, where many modern service interfaces, such as call routing systems, are increasingly prevalent, context information, e.g., comprised in augmentation information 150, can enable rapid traversal of service interfaces. Context and supplementary information, such as from a user profile, can aid in populating parameters associated with a service interface. This can enable selection of preferred communication modalities, communication of location information, and aid in traversing service interface schema. As an example, where a user calls her husband, location information 130 can be shared with his device via CAC 110 and augmentation information 150, without needing to share her heartrate information, e.g., via a connected wearable heart monitor, with him. In contrast, where the wife's next call is to her physician, her location may not be shared, but her heartrate information, and indeed a history of her heartrate information, can be shared via augmentation information 150 such that the information is populated via the service interface to her medical record to facilitate her call with the physician. Additionally, the communication modality in both the call to her husband and to her physician can be designated as a preferred voice mode wherein sensor information 120 indicates that there is not a reason to select a different mode that the one selected by the wife in imitating the calls. However, where the call to the husband is done from a moving car, CAC 110 can designate that the call mode is via speakerphone so that the wife does not have to hold the phone while driving.

Figure 2:
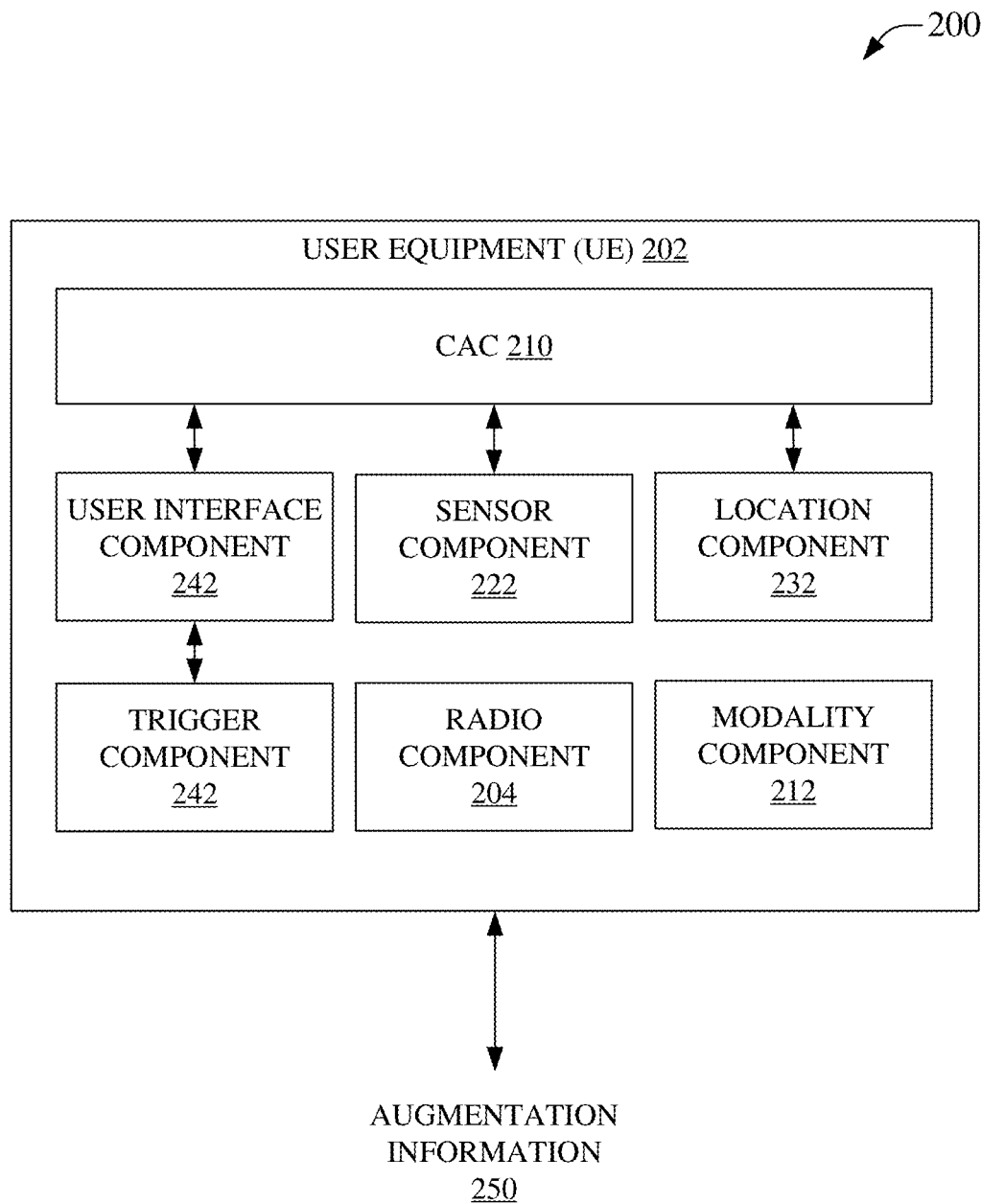
FIG. 2 is a depiction of an example system that facilitates context sensitive communication augmentation via a user equipment in accordance with aspects of the subject disclosure.

FIG. 2 is a depiction of a system 200 that can facilitate context sensitive communication augmentation via a user equipment (UE) in accordance with aspects of the subject disclosure. System 200 can include UE 202 that can comprise CAC 210 to enable intelligent selection and adaption of communication modalities based on a context related to a communication session. CAC 210 can adapt communication modalities to provide automatic and intelligent augmentation, e.g., selection, modification, and adaptation, of a communication modality of a communication session. CAC 210 can receive sensor information from sensor component 222. Sensor component 222 can collect and/or receive sensor information from sensors of UE 202, sensors in communication with UE 202, or other sensors. As an example, sensor component 222 can receive accelerometer data from an accelerometer of UE 202, audio data from a microphone of UE 202, touch information from a UI of UE 202, etc. As another example, sensor component 222 can receive biometric data from a wearable computer in communication with UE 202, image data from another UE in communication with UE 202, image data from a wearable computer in communication with UE 202, fire/smoke/carbon dioxide data from a monitoring device in communication with UE 202, etc. In another example, sensor component 222 can receive weather data from a web server based on the location of UE 202, Amber alert data from a remote server, etc.

In an embodiment, CAC 210 can receive location information from location component 232. Location information can comprise proximity, latitude/longitude, an address, GPS coordinates, etc. CAC 210 can determine a context based on the sensor and location information, e.g., from 222 and 232. This determined context can be employed in selecting and/or modifying a communication modality for a communication session.

Modality component 212 of system 200 can identify communication modalities. These modalities can be communicated to CAC 210. CAC 210 can select, score, rank, order, etc., the modalities based on a context as determined from sensor and/or location data. In an embodiment, communication augmentation can include selecting a preferred communication modality, such as from communication modalities associated with a communication device like a smartphone, tablet computer, wearable device, laptop, vehicle computer, etc. As an example, modality component 212 can determine that UE 202 comprises an LTE mode, a 3GPP mode, an SMS mode, a MMS mode, a video camera mode, a speakerphone mode, a touch interface mode, etc. Based on sensor and location information, CAC 210 can determine that a communication session is related to a context and can select from the modes determined by modality component 212. Moreover, where the context changes, CAC 210 can update the preferred mode to adapt the communication session.

Trigger information can be determined by trigger component 242. Trigger information can be received by CAC 210, to initiate determination of a preferred communication modality by CAC 210. Trigger information can be received in response to manual, automatic, or remote triggering or triggering rules. Manual triggering can be associated with initiating a session, selecting a function of UE 202 via UI component 242, or nearly any other form of manual triggering of CAC 210 functionality. Further, triggering can be automatic and in response to sensor or location information via sensor component 222 or location component 232. Moreover, trigger component 242 can receive a trigger signal from an external source, e.g., remote triggering. Remote triggering can enable UE 202 comprising CAC 210 to capture sensor and location data and participate in a communication session in response to being externally triggered. In some embodiments, privacy and security components can be employed to discourage abuse of remote triggered communication sessions. In an aspect, where context sensing via sensor component 222 is employed in the background, triggering of a communications session, along with communication augmentation, can be automated. As an example, where a smartphone monitors audio and captures a user saying "I'm lost," can automatically trigger CAC 210 to determine a preferred communication modality based on sensor information 220 and location information 230 and connect UE 202 with a service interface for assistance at finding their way. With the expanding number of sensors associated with user devices, e.g., mobile phones, wearable computing, smart objects, tablets, vehicles, etc., the ability to capture a context and leverage that context to enable communication augmentation continues to increase. In an aspect, a trigger can be associated with capturing contextual information from sensors and leveraging that context to augment communication.

In an aspect, service interfaces can employ context information to enable rapid traversal of service interfaces. Context and supplementary information, such as from a user profile, can aid in populating parameters associated with a service interface. This can enable selection of preferred communication modalities, communication of location information, and aid in traversing service interface schema.

CAC 210 can be coupled to UI component 242. UI component 242 can receive information from, and source information for, a UI of UE 202 in conjunction with context sensitive communication augmentation. In an embodiment, UI component 242 can support use of a "help" button placed on the UI of UE 202. Activation of the "help" button can initiate a communication session in a context sensitive manner. Further, sensor, location, and user profile information can be made accessible to a service interface upon activation of the "help" button. As such, context sensitive communication augmentation can enable, for example, one-touch assist functionality. In this example, pressing help at an airport can initiate a communication session in a UI mode allowing touch and tap interface functionality. Further, in this example, user profile information can be routed to a service interface of the airport authority to aid in traversing a selection tree and routing the communication session to an operator associated with an airline that is hosting the user's flight that evening. Further, in the example, where there is poor weather, which can be determined from sensors on the user's UE or via a weather server based on the UE location, flight delay information can be automatically requested by CAC 210 via the airport authority's service interface device. Moreover, when the delay information is sent to the UE, it can be formatted for presentation in a UI mode based on the designation by CAC 210, such that the user can scroll through the information and tap on items of interest.

CAC 210 can generate augmentation information 250 that can be made available to a device associated with a target of the communication. Augmentation information, and replies thereto, can be made via radio component 204. In some embodiments, radio component 204 can be the same as the radio of UE 202. Augmentation information 250 can be employed by the target to determine compatibility with the determined mode of communication and/or negotiate other available modes of communication. A service interface component can therefore facilitate communications in the determined modality or, where the determined modality is not supported, other modalities can be selected based on a ranking of available modalities for the UE and the service interface component, in an intelligent and automatic manner. Moreover, additional context and/or sensor data can be communicated to service interface component as part of the communication from CAC 210, e.g., via augmentation information 250, such as captured audio, video, motion, location, orientation, acceleration, temperature, pressure, direction of travel, or other information associated with sensors of the UE or those in communication with the UE. Sensors can provide additional context information, via sensor component 222, such as health history, blood pressure, heart rate, blood oxygen saturation, carbon monoxide detection, smoke detection, ionized particle detection, gunshot triangulation, etc., via other sensors in communication with the UE and/or associated profiles, etc.

Figure 3:
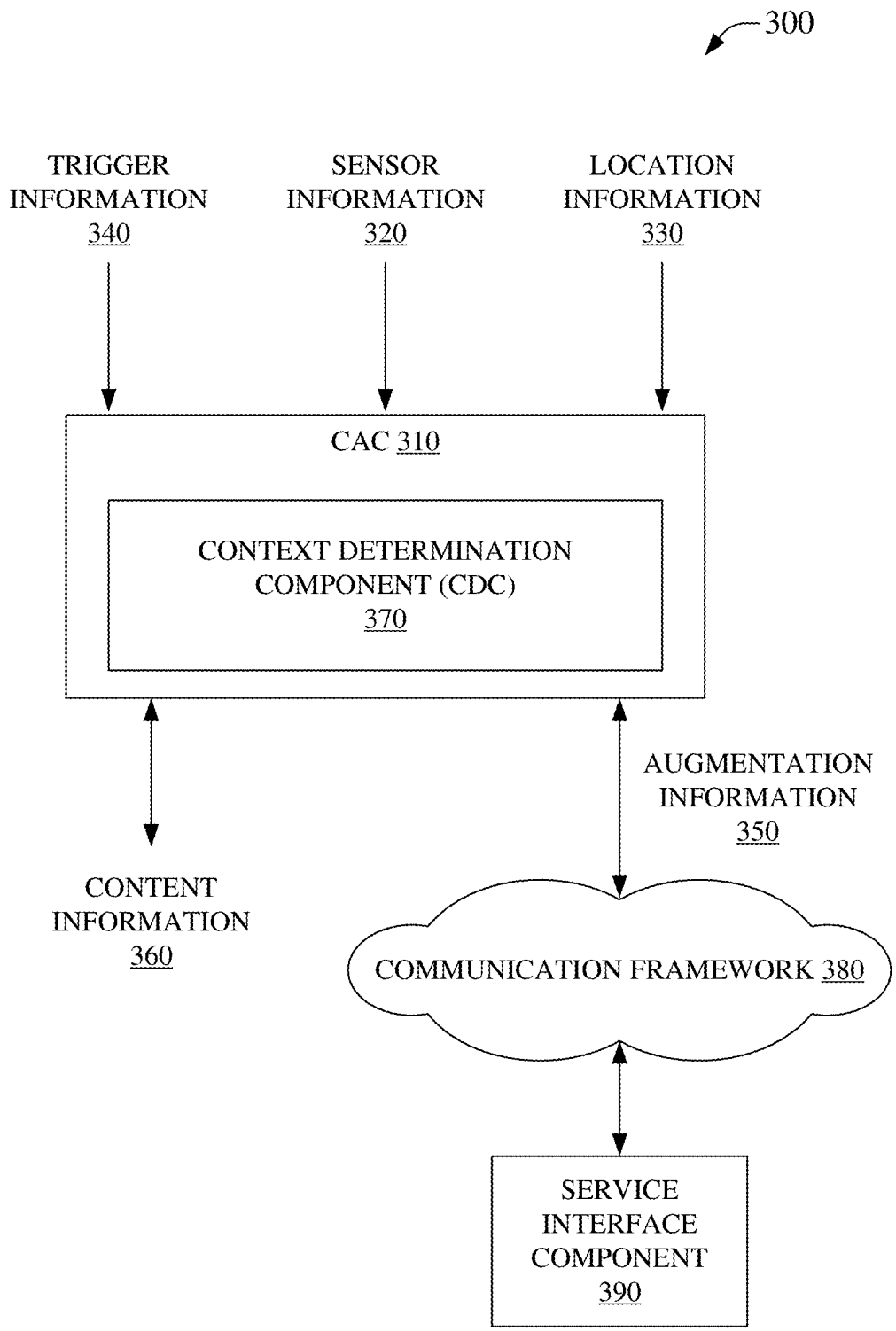
FIG. 3 illustrates an example system that facilitates context sensitive communication augmentation with a service interface in accordance with aspects of the subject disclosure.

FIG. 3 illustrates a system 300 that facilitates context sensitive communication augmentation with a service interface in accordance with aspects of the subject disclosure. System 300 can comprise CAC 310 to enable intelligent selection and adaption of communication modalities based on a context related to a communication session. CAC 310 can adapt communication modalities to provide automatic and intelligent augmentation, e.g., selection, modification, and adaptation, of a communication modality of a communication session. CAC 310 can receive sensor information 320. Sensor information 320 can be collected and/or received from sensors of UE 302, sensors in communication with UE 302, or other sensors. In an embodiment, CAC 310 can receive location information 330. Location information 330 can comprise proximity, latitude/longitude, an address, GPS coordinates, etc.

CAC 310 can comprise context determination component (CDC) 370 that can determine a context based on the sensor and location information, e.g., 320 and 330. This determined context can be employed in selecting and/or modifying a communication modality for a communication session. In an embodiment, the act of communication augmentation can include selecting a preferred communication modality, such as from communication modalities associated with a communication device, based on the determined context. In some embodiments, communication augmentation can comprise adapting or modifying a communication modality for a communication session in progress based on the determined context.

Trigger information 340 can be employed to initiate determination of a preferred communication modality by CAC 310. Trigger information 340 can be received in response to manual, automatic, or remote triggering or triggering rules. In embodiments where context sensing via sensor information 320 is employed, triggering of a communications session and communication augmentation can be automated. In an aspect, a trigger can be associated with capturing contextual information from sensors and leveraging that context to augment communication. Augmenting communication can include determining a mode of communication based on the context, e.g., via CDC 370.

CAC 310 can generate augmentation information 350, comprising the determined mode of communication, which can be made available to a device associated with service interface component 390 via communication framework 380. Communication framework 380 can comprise a wired and/or a wireless communication link. In some embodiments, communication framework 380 can comprise a radio access network (RAN), the internet, a local area network (LAN), etc. Augmentation information 350 can be employed by service interface component 390 to determine compatibility with the determined mode of communication and/or negotiate other available modes of communication. As an example, where augmentation information 350 indicates that video chat is preferred to voice but service interface component 390 determines that video chat is not an available modality, service interface component 390 can then indicate to CAC 310, that voice mode is acceptable and video chat is unavailable. Service interface component 390, e.g., a component of systems related to a target of a communication session, can therefore facilitate communications in a determined modality or, where the determined modality is not supported, other modalities that can be selected based on a ranking of available modalities for the UE and those available via service interface component 390 for a given target.

Moreover, additional context and/or sensor data can be communicated to service interface component 390 as part of the communication from CAC 310, e.g., via augmentation information 350, such as audio, video, motion, location, orientation, acceleration, temperature, pressure, direction of travel, or other information associated with sensors of the UE or those in communication with the UE, e.g., sensor information 320. Sensor information 320 can therefore provide information such as health history, blood pressure, heart rate, blood oxygen saturation, carbon monoxide detection, smoke detection, ionized particle detection, gunshot triangulation, etc., via other sensors in communication with the UE and/or associated profiles, etc.

Service interface component 390 can facilitate rapid traversal of service interfaces based on information comprising augmentation information 350 received via communication framework 380. Context and supplementary information, such as from a user profile, can aid in populating parameters associated with a service interface. This can enable selection of preferred communication modalities, communication of location information, and aid in traversing service interface schema.

CAC 310 can facilitate access to content information 360. Content information 360 can comprise additional information employed in determining the score, rank, order, etc., of communication modalities, interfacing with service interface component 390, providing permissions as to sharing of, or access to, sensitive information, selecting sensors, triggers, etc. In some embodiments, content information 360 can be presented via a user interface, as discloses elsewhere herein. In other embodiments, content information 360 can be presented via another interface, such as a voice interface, biosensors, spatial gesturing, etc.

Figure 4:
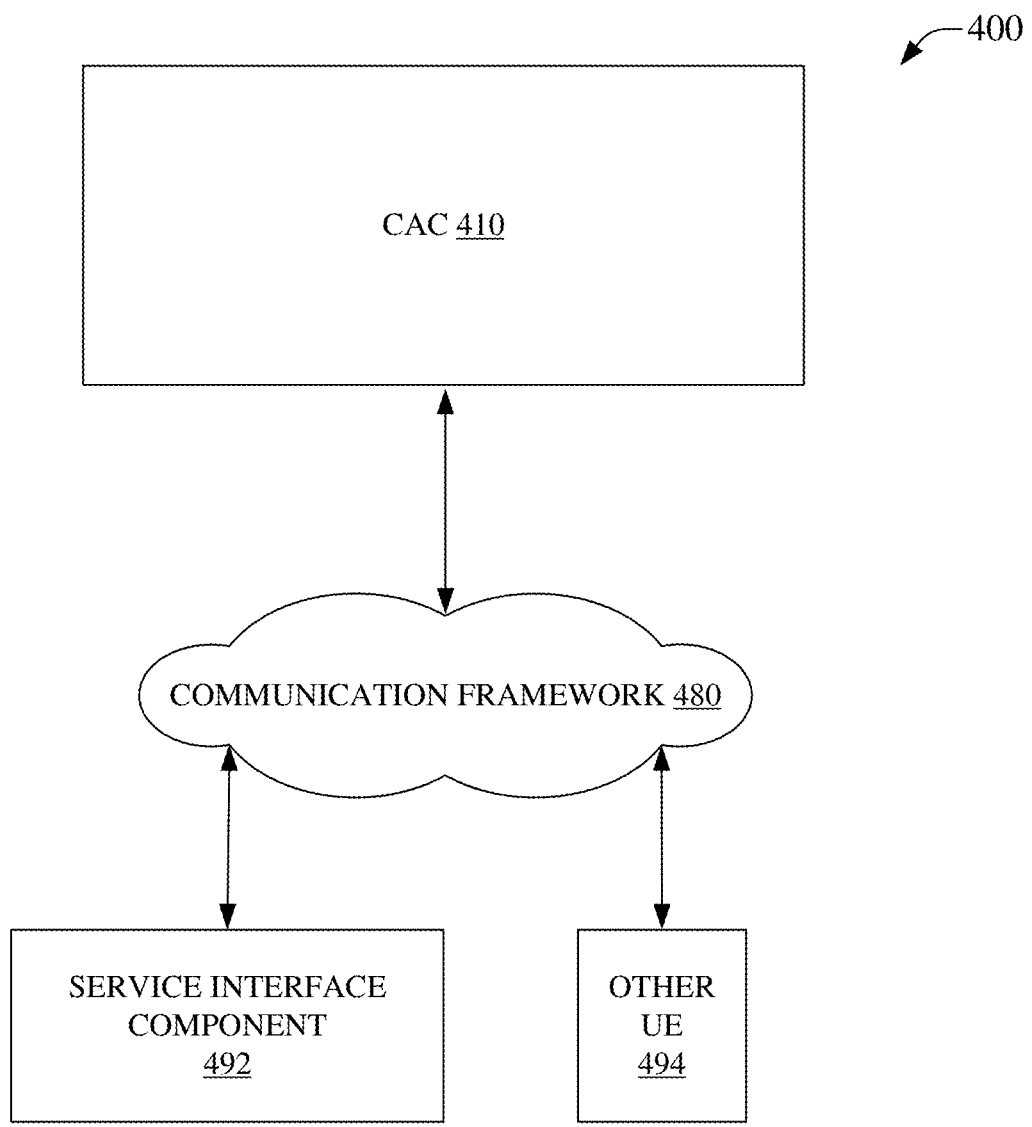
FIG. 4 illustrates an example system that facilitates context sensitive communication augmentation with another user equipment in accordance with aspects of the subject disclosure.

FIG. 4 illustrates a system 400 that facilitates context sensitive communication augmentation with another user equipment in accordance with aspects of the subject disclosure. System 400 can comprise CAC 410 to facilitate intelligent selection and adaption of communication modalities based on a context related to a communication session. CAC 410 can adapt communication modalities to provide automatic and intelligent augmentation, e.g., selection, modification, and adaptation, of a communication modality of a communication session. CAC 410 can receive sensor information that can be collected and/or received from sensors of a UE, sensors in communication with a UE, or other sensors. In an embodiment, CAC 410 can receive location information, which can comprise proximity, latitude/longitude, an address, GPS coordinates, etc. CAC 410 can determine a context based on the sensor and location information. This determined context can be employed in selecting and/or modifying a communication modality for a communication session. In an embodiment, the act of communication augmentation can include selecting a preferred communication modality, such as from communication modalities associated with a communication device, based on the determined context. In some embodiments, communication augmentation can comprise adapting or modifying a communication modality for a communication session in progress based on the determined context.

CAC 410 can be coupled to service interface component 492 via communication framework 480. As such, CAC 410 can facilitate access to augmentation information generated in response to a determined context. This can comprise a determined mode of communication, which can be made available to a device associated with service interface component 492. Communication framework 480 can comprise a wired and/or a wireless communication link. In some embodiments, communication framework 480 can comprise a radio access network (RAN), the internet, a local area network (LAN), etc. Augmentation information can be employed by service interface component 492 to determine compatibility with a determined mode of communication and/or negotiate other available modes of communication. As an example, where augmentation information indicates that SMS is preferred to voice but service interface component 492 determines that SMS is not an available modality, service interface component 492 can indicate to CAC 410, that voice mode is acceptable and SMS is unavailable. Service interface component 492, e.g., a component of systems related to a target of a communication session, can therefore facilitate communications in a determined modality, as indicated in augmentation information, or, where the determined modality is not supported, other modalities that can be selected based on a ranking of available modalities for the UE and those available via service interface component 492 for a given target.

Moreover, additional context and/or sensor data can be communicated to service interface component 492 as part of coupling to CAC 410, such as audio, video, motion, location, orientation, acceleration, temperature, pressure, direction of travel, or other information associated with sensors of the UE or those in communication with the UE. Sensor information can therefore provide information such as health history, blood pressure, heart rate, blood oxygen saturation, carbon monoxide detection, smoke detection, ionized particle detection, gunshot triangulation, etc., via other sensors in communication with the UE and/or associated profiles, etc.

Service interface component 492 can facilitate rapid traversal of service interfaces based on information comprising augmentation information received via communication framework 480 from CAC 410. Context and supplementary information, such as from a user profile, can aid in populating parameters associated with a service interface. This can enable selection of preferred communication modalities, communication of location information, and aid in traversing service interface schema.

CAC 410 can be coupled to other UE 494 via communication framework 480. As such, CAC 410 can facilitate access to augmentation information generated in response to a determined context, which can comprise a determined mode of communication that can be made available to other UE 494. Augmentation information can be employed by other UE 494 to determine compatibility with a determined mode of communication and/or negotiate other available modes of communication. As an example, where augmentation information indicates that SMS is preferred to voice and other UE 494 determines that both SMS and voice are available, other UE 494 can indicate to CAC 410, that SMS mode is acceptable and voice is available as an alternative. Other UE 494 can therefore facilitate communications in a determined modality, as indicated in augmentation information, or, where the determined modality is not supported, other modalities that can be selected based on a ranking of available modalities for the UE and those available via other UE 494.

Moreover, additional context and/or sensor data can be communicated to other UE 494 as part of coupling to CAC 410, such as audio, video, motion, location, orientation, acceleration, temperature, pressure, direction of travel, or other information associated with sensors of the UE or those in communication with the UE. Sensor information can therefore provide information such as health history, blood pressure, heart rate, blood oxygen saturation, carbon monoxide detection, smoke detection, ionized particle detection, gunshot triangulation, etc., via other sensors in communication with the UE and/or associated profiles, etc.

In an aspect, system 400 illustrate that CAC 410 can enable a communication session with multiple entities, e.g., service interface component 492 and other UE 494. This multiple entity communication session can comprise different communication modalities among the different entities. In an aspect, this can be useful where more than one target is to be bound in a communication session. As an example, for teleconferences, CAC 410 can enable rapid convergence on communication modalities in an automated manner that facilitates the equipment being employed by each participating entity. This aspect can also prove useful in conditions where one entity is a service entity, in that the augmentation information for the service entity can rapidly travers call trees to get CAC 410 rapidly to a relevant service arena.

In some embodiments, where a preferred communication modality of CAC 410 is not supported by either service interface component 492 or the other UE 494, the entities can be notified of an interruption due to adapting the communication modality or truncation of the communication session due to lack of a common modality between CAC 410 and the other entity. As an example, where CAC 410 indicates instant message mode and a communication session is entered with service interface component 492 and other UE 494, but then CAC 410 later changes to a voice mode not supported by service interfaced component 492, then some or all entities can be notified that service interface component 492 is temporarily not part of the communication session under voice mode. In other embodiments, transformation between modalities can be employed to maintain the communication session. As an example, where CAC 410 switches from instant message mode to voice mode, the voice communications can be transformed by speech to text engines so as to be compatible with a mode of the service interface component 492.

Figure 5:
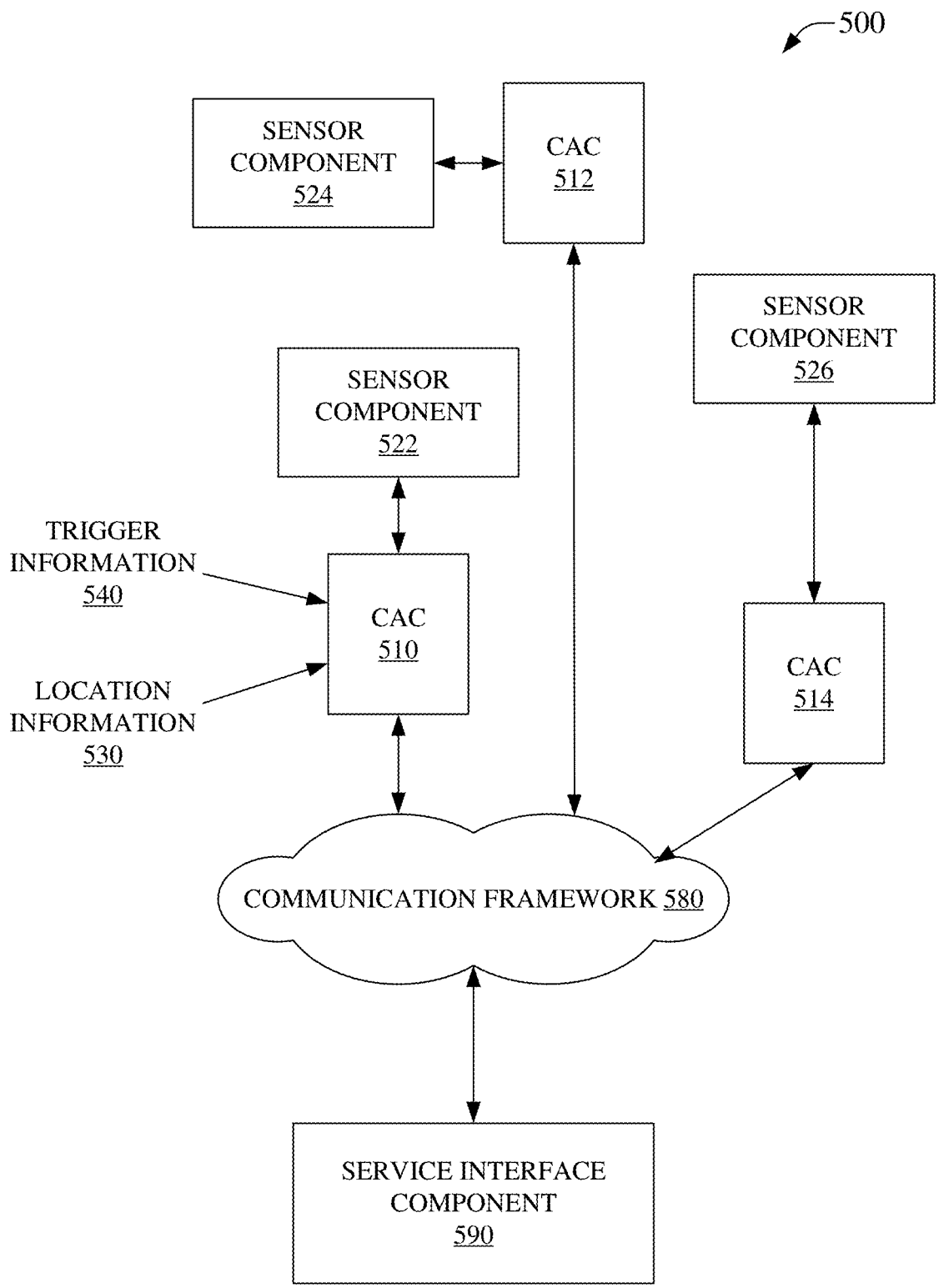
FIG. 5 illustrates an example system facilitating context sensitive communication augmentation based on distributed context sensing in accordance with aspects of the subject disclosure.

FIG. 5 illustrates a system 500 that facilitates context sensitive communication augmentation based on distributed context sensing in accordance with aspects of the subject disclosure. System 500 can include communication augmentation component (CAC) 510 that can intelligently select and adapt communication modalities based on the context related to a communication session. CAC 510 can adapt communication modalities to provide automatic and intelligent augmentation, e.g., selection, modification, and adaptation, of a communication modality of a communication session. CAC 510 can receive sensor information via sensor component 522 and location information 530. CAC 510 can determine a context based on the sensor information from 522 and location information 530. This determined context can be employed in selecting and/or modifying a communication modality for a communication session. In an embodiment, communication augmentation can include selecting a preferred communication modality, such as from communication modalities associated with a communication device like a smartphone, tablet computer, wearable device, laptop, vehicle computer, etc. In some embodiments, communication augmentation can comprise adapting or modifying a communication modality for a communication session in progress.

Trigger information 540 can be received by CAC 510, which can be employed to enable determination of a preferred communication modality by CAC 510. Trigger information 540 can be received in response to manual, automatic, or remote triggering or triggering rules. Manual triggering can be associated with initiating a call, text message, AV message, etc., activating an application such as on a smartphone or tablet computer, etc., selecting a function and/or application, via a UI, etc., or nearly any other form of manually triggering CAC 510 functionality.

In an aspect, where context sensing via sensor component 522 is employed, triggering of a communications session, along with communication augmentation, can be automated. In an aspect, a trigger can be associated with capturing contextual information from sensor component 522 and leveraging that context to augment communication. Augmenting communication can include determining a mode of communication based on the context, as an example, where a phone is in a noisy environment, text messaging can be selected over voice communication to improve the likelihood of successful communication.

CAC 510 can generate augmentation information, which can be made available to a device associated with a target of the communication. Augmentation information can be employed by the target to determine compatibility with the determined mode of communication and/or negotiate other available modes of communication. Service interface component 590, e.g., a component of systems related to the target, can therefore facilitate communications in the determined modality or, where the determined modality is not supported, other modalities can be selected based on a ranking of available modalities for the UE and the service interface component, in an intelligent and automatic manner. Moreover, additional context and/or sensor data can be communicated to service interface component 590 via communication framework 580 as part of the communication from CAC 510, such as captured audio, video, motion, location, orientation, acceleration, temperature, pressure, direction of travel, or other information associated with sensor component 522 of the UE or those in communication with the UE. Sensor component 522 can provide additional context information such as health history, blood pressure, heart rate, blood oxygen saturation, carbon monoxide detection, smoke detection, ionized particle detection, gunshot triangulation, etc., via other sensors in communication with the UE and/or associated profiles, etc.

In an aspect, service interface component 590 can enable rapid traversal of service interfaces. Context and supplementary information, such as from a user profile, can aid in populating parameters associated with a service interface. This can enable selection of preferred communication modalities, communication of location information, and aid in traversing a service interface schema.

System 500 can further comprise CAC 512 and CAC 514. These additional CACs can be associated with other devices coupled to communication framework 580. In an aspect, CAC 510 can access sensor information from sensor component 524 and sensor component 526 via CAC 512 and CAC 514 respectively. As such, a wider context can be determined by CAC 510 with regard to context sensitive communication augmentation, e.g., with service interface component 590 via communication framework 580. As an example, where trigger information 540 relates to a high speed deceleration, such as might be experienced in a car accident, CAC 510 can be triggered to determine a score, rank or preference order of communication modalities based on sensor information from sensor component(s) 522-526. This can be effected by CAC 510 determining that the sensor component(s) 524-526 can have access to useful formation. Information relating to sensor component(s) 524-526, such as sensor types, models, ranges, etc., can be received from CAC 512-514. In an embodiment, CACs, e.g., 510-514 can register or list information relating to sensor components that can be accessed by other CACs to facilitate knowledge of other sensors around them. As such, in the example, audio or image data can be captured from other sensor components 524-526, that can then be used by CAC 510 in communication augmentation with service interface component 590. Where photo and audio are included, and the trigger event causes CAC 510 to initiate a speakerphone call to an emergency services interface, e.g., service interface component 590, the augmentation information can include the declaration information, the photos, and the audio, which can enable traversal of service interface component 590 to quickly connect the speakerphone call to an appropriate emergency operator who can consider the sensor data in triaging the event and dispatching medical, fire, police, etc. In large-scale emergency situations, such as earthquake, tornado, terrorist acts, etc., collecting data from other CAC connected sensor components, e.g., 524-526, could serve to significantly improve responses. As an example, in the bombing of a marathon, the explosions can initiate an automatic trigger based on a microphone picking up the audio signature of a bomb explosion. This automatic trigger could cause a CAC to collect other sensor data, including from other UEs with CACs nearby, and determine that a video call should be made to the service interface component of the police. The police service interface component would almost certainly be flooded with calls, in which case it can indicate to the CAC that only text message modes are allowed to avoid overwhelming the communication framework. The CAC can then begin a text message communication session in which it communicated the collected data from the several sensors and allows the user to interact with the police via text message. Of note in this example, there was no need for the user to initiate the call, select the mode of communication, gather sensor data or location inflation, etc., and instead, these actions are all automated to allow rapid efficient communication of information to the service interface component of the police.

Figure 6:
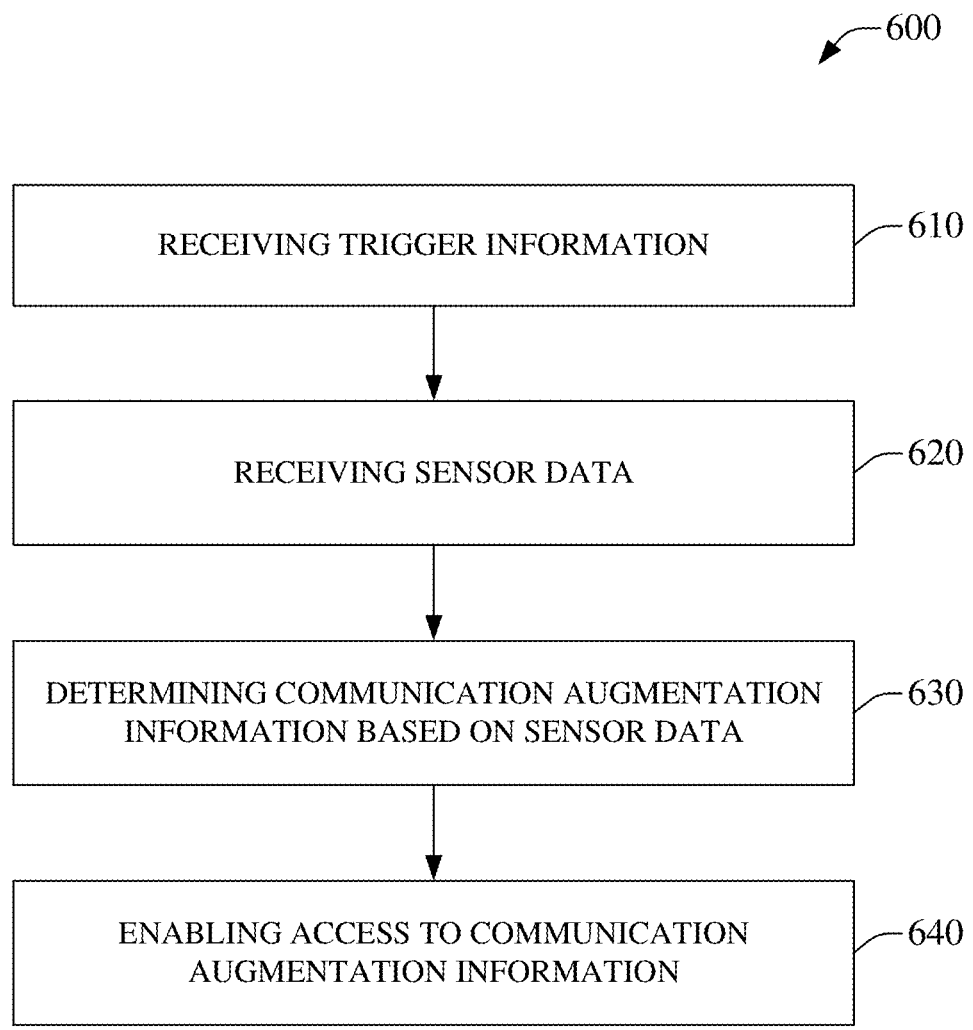
FIG. 6 illustrates an example method facilitating context sensitive communication augmentation in accordance with aspects of the subject disclosure.
Figure 7:
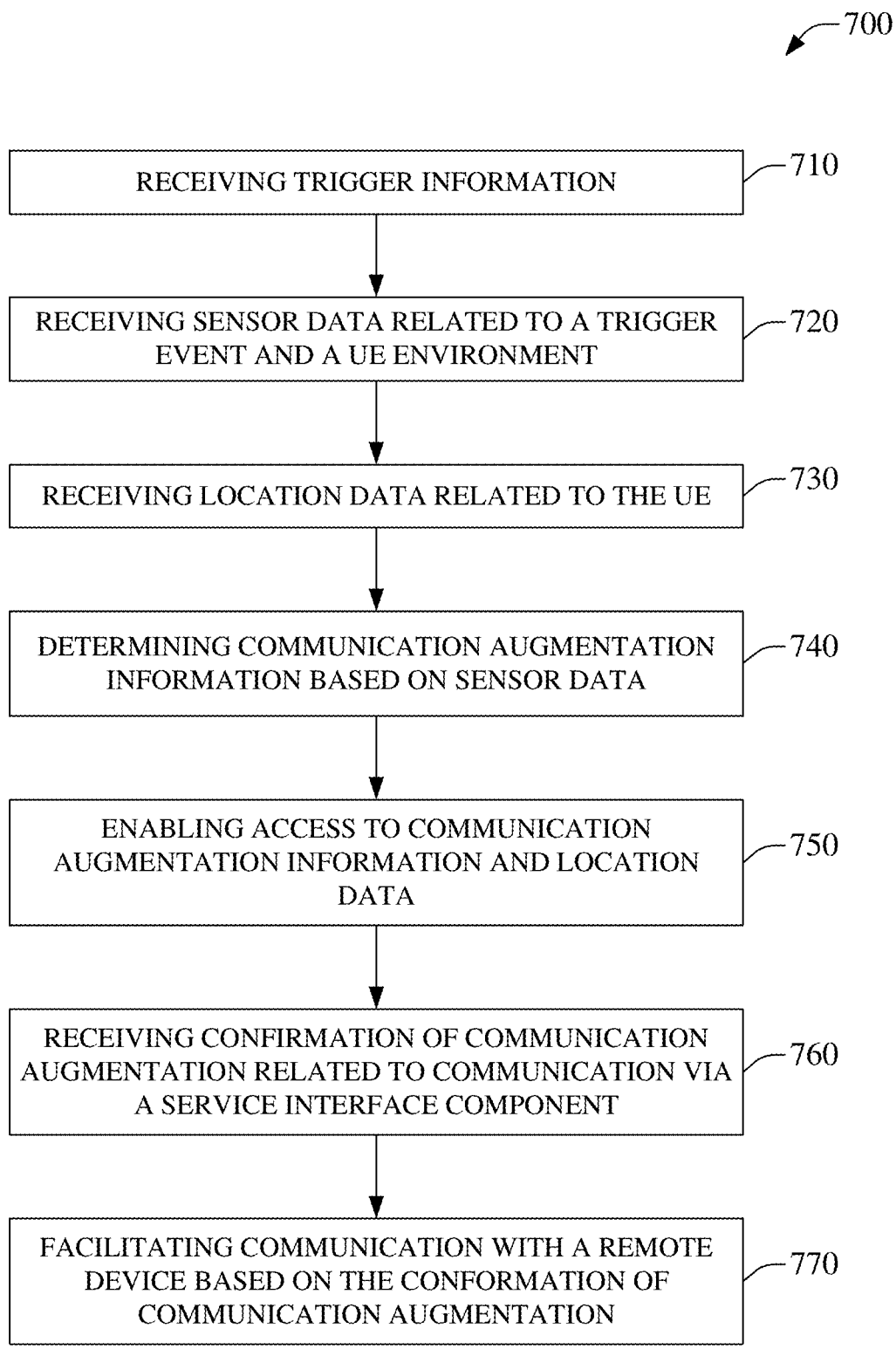
FIG. 7 depicts an example method facilitating context sensitive communication augmentation with a remote device via a service interface in accordance with aspects of the subject disclosure.
Figure 8:
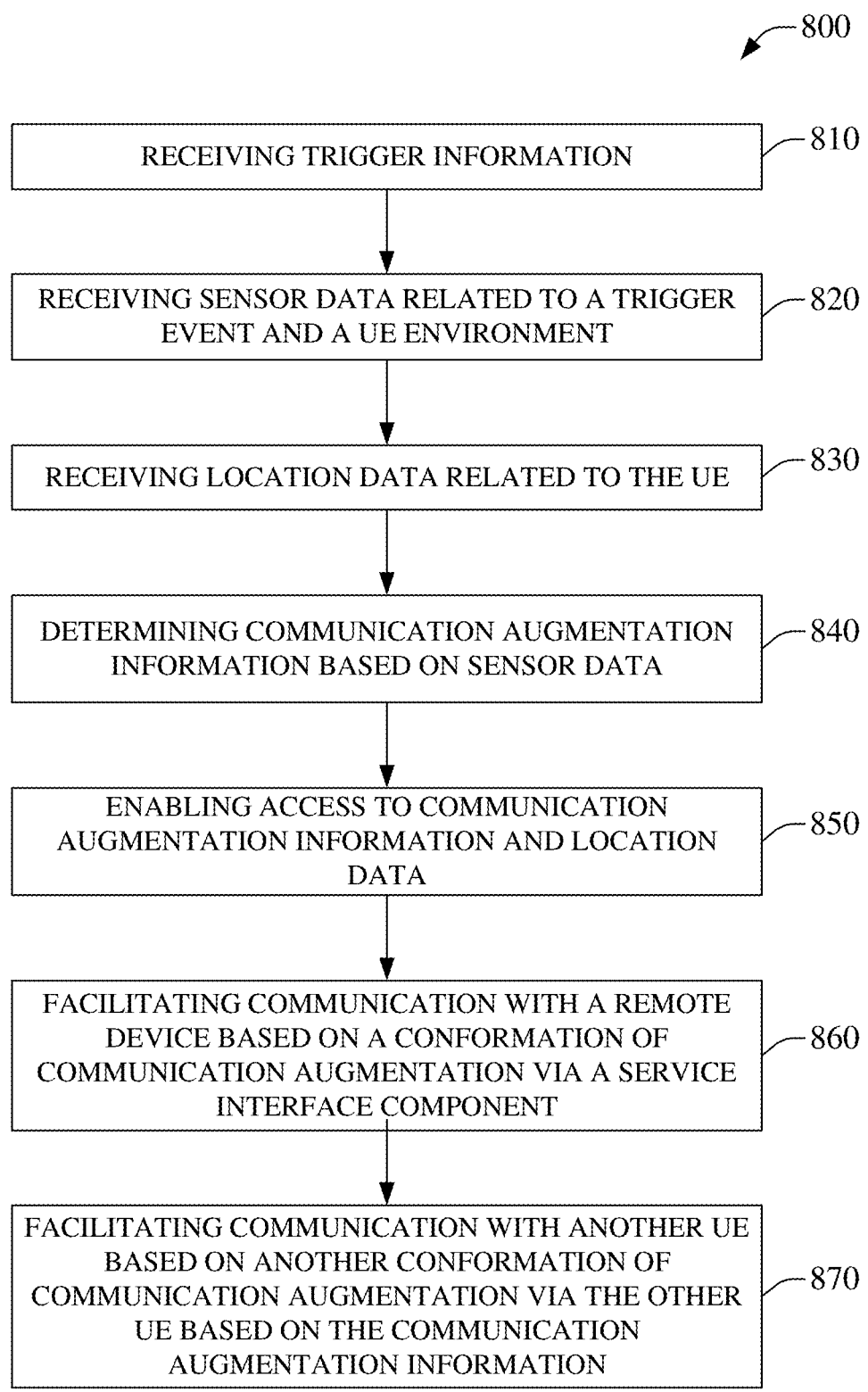
FIG. 8 illustrates an example method facilitating context sensitive communication augmentation with another user equipment in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described.

It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 facilitating context sensitive communication augmentation in accordance with aspects of the subject disclosure. At 610, method 600 can comprise receiving trigger information. Trigger information can facilitate determination of a preferred communication modality by a CAC. Trigger information can be received in response to manual, automatic, or remote triggering or triggering rules. Manual triggering can be associated with initiating a session, selecting a function of a UE via UI component, or nearly any other form of manual triggering of CAC functionality. Further, triggering can be automatic and in response to sensor or location information via a sensor component or a location component. Moreover, a trigger component can receive a trigger signal from an external source, e.g., remote triggering. Remote triggering can enable a UE comprising a CAC to capture sensor and location data and participate in a communication session in response to being externally triggered. In some embodiments, privacy and security components can be employed to discourage abuse of remote triggered communication sessions. In an aspect, where context sensing via a sensor component is employed, triggering of a communications session, along with communication augmentation, can be automated. With the expanding number of sensors associated with user devices, e.g., mobile phones, wearable computing, smart objects, tablets, vehicles, etc., the ability to capture a context and leverage that context to enable communication augmentation continues to improve. In an aspect, a trigger can be associated with capturing contextual information from sensors and leveraging that context to augment communication.

At 620, method 600 can comprise receiving sensor data. Sensor data can comprise information from sensors of a UE, sensors in communication with a UE, or other sensors. As an example, sensor data can be accelerometer data from an accelerometer of a UE, audio data from a microphone of a UE, touch information from a UI of a UE, etc., biometric data from a wearable computer in communication with a UE, image data from another UE in communication with a UE, image data from a wearable computer in communication with a UE, fire/smoke/carbon dioxide data from a monitoring device in communication with a UE, etc., weather data from a web server based on the location of a UE, Amber alert data from a remote server, etc.

At 630, method 600 can comprise determining communication augmentation information based on the sensor data from 620. Communication augmentation can comprise selection, modification, and adaptation, of a communication modality of a communication session. A context can be determined based on the sensor data. The context can be employed in selecting, ranking, scoring, or sorting a communication modality. This can result in preferred communication modalities. Further, the communication augmentation information can comprise sensor data that can be communicated to another device in conjunction with identifying one or more preferred communication modalities.

At 640, method 600 can comprise enabling access to the communication augmentation information, such as by a service interface device via a communication framework. At this point method 600 can end. The communication augmentation information can comprise one or more preferred communication modalities that can be filtered or compared against available communication modalities of the service interface. This can result in initiation of a communication session based on one of the communication modalities supported and preferred by both the requestor and the service interface device.

FIG. 7 illustrates a method 700 that facilitates context sensitive communication augmentation with a remote device via a service interface in accordance with aspects of the subject disclosure. At 710, method 700 can comprise receiving trigger information. Trigger information can facilitate determination of a preferred communication modality, such as by a CAC, etc. Trigger information can be received in response to manual, automatic, or remote triggering or triggering rules. Manual triggering can be associated with initiating a session, selecting a function of a UE via UI component, or nearly any other form of manual triggering of CAC functionality. Further, triggering can be automatic, such as in response to sensor or location information via a sensor component or a location component. Moreover, a trigger component can receive a trigger signal from an external source, e.g., remote triggering. Remote triggering can enable, for example, a UE comprising a CAC, to capture sensor and location data and participate in a communication session in response to being externally triggered. In some embodiments, privacy and security components can be employed to discourage abuse of remote triggered communication sessions. In an aspect, where context sensing via a sensor component is employed, triggering of a communications session, along with communication augmentation, can be automated. In an aspect, a trigger can be associated with capturing contextual information from sensors and leveraging that context to augment communication.

At 720, method 700 can comprise receiving sensor data related to a trigger event and a UE environment. Sensor data can comprise information from sensors of a UE, sensors in communication with a UE, or other sensors. As an example, sensor data can be accelerometer data from an accelerometer of a UE, audio data from a microphone of a UE, touch information from a UI of a UE, etc., biometric data from a wearable computer in communication with a UE, image data from another UE in communication with a UE, image data from a wearable computer in communication with a UE, fire/smoke/carbon dioxide data from a monitoring device in communication with a UE, etc., weather data from a web server based on the location of a UE, Amber alert data from a remote server, etc.

At 730, method 700 can comprise receiving location information related to the UE. Location information can comprise proximity, latitude/longitude, an address, GPS coordinates, etc. In an aspect, location information can be leveraged to exploit sensor information that can be location dependent, for example, but not limited to, accessing weather information related to location, accessing traffic information based on location, accessing proximity to events/entities based on UE location, etc.

At 740, method 700 can comprise determining communication augmentation information based on the sensor data from 720. Communication augmentation can comprise selection, modification, and adaptation, of a communication modality of a communication session. A context can be determined based on the sensor data. The context can be employed in selecting, ranking, scoring, or sorting a communication modality. This can result in preferred communication modalities. Further, the communication augmentation information can comprise sensor data that can be communicated to another device in conjunction with identifying one or more preferred communication modalities.

At 750, method 700 can comprise enabling access to the communication augmentation information and location information, such as by a service interface device via a communication framework. The communication augmentation information can comprise one or more preferred communication modalities that can be filtered or compared against available communication modalities of the service interface. This can result in initiation of a communication session based on one to the communication modalities supported and preferred by both the requestor and the service interface device.

At 760, method 700 can comprise receiving confirmation of communication augmentation related to communication via a service interface component. The service interface component can indicate an acceptable communication modality from the set, such as an ordered or ranked set, of communication modalities included in the communication augmentation information of 750. Where the preferred communication modality is selected, a confirmation can be sent in reply. Where the preferred modality is not supported or otherwise unacceptable, a next modality can be selected, and information relating to acceptance of this next modality can be returned. Where no modality is acceptable, notice of failure and/or a list of acceptable modalities can be returned.

At 770, method 700 can comprise facilitating communication with a remote device based on the confirmation of communication augmentation. At this point method 700 can end. The remote device can be distinct from the service interface component or can comprise the service interface component. As an example, a corporate phone system can include a service interface component to allow callers to route through to the correct person in the correct department. Routing a caller from the service interface component can include routing to a mobile device that is distinct from the service interface component. In other embodiments, for example a emergency services department can include a service interface component that is part of the same phone system used by operators to answer calls routed to them.

FIG. 8 illustrates a method 800 that facilitates context sensitive communication augmentation with another user equipment in accordance with aspects of the subject disclosure. At 810, method 800 can comprise receiving trigger information. Trigger information can facilitate determination of a preferred communication modality, such as by a CAC, etc. Trigger information can be received in response to manual, automatic, or remote triggering or triggering rules. Manual triggering can be associated with initiating a session, selecting a function of a UE via UI component, or nearly any other form of manual triggering of CAC functionality. Further, triggering can be automatic, such as in response to sensor or location information via a sensor component or a location component. Moreover, a trigger component can receive a trigger signal from an external source, e.g., remote triggering. Remote triggering can enable, for example, a UE comprising a CAC, to capture sensor and location data and participate in a communication session in response to being externally triggered. In some embodiments, privacy and security components can be employed to discourage abuse of remote triggered communication sessions. In an aspect, where context sensing via a sensor component is employed, triggering of a communications session, along with communication augmentation, can be automated. In an aspect, a trigger can be associated with capturing contextual information from sensors and leveraging that context to augment communication.

At 820, method 800 can comprise receiving sensor data related to a trigger event and a UE environment. Sensor data can comprise information from sensors of a UE, sensors in communication with a UE, or other sensors. As an example, sensor data can be accelerometer data from an accelerometer of a UE, audio data from a microphone of a UE, touch information from a UI of a UE, etc., biometric data from a wearable computer in communication with a UE, image data from another UE in communication with a UE, image data from a wearable computer in communication with a UE, fire/smoke/carbon dioxide data from a monitoring device in communication with a UE, etc., weather data from a web server based on the location of a UE, Amber alert data from a remote server, etc.

At 830, method 800 can comprise receiving location information related to the UE. Location information can comprise proximity, latitude/longitude, an address, GPS coordinates, etc. In an aspect, location information can be leveraged to exploit sensor information that can be location dependent, for example, but not limited to, accessing weather information related to location, accessing traffic information based on location, accessing proximity to events/entities based on UE location, etc.

At 840, method 800 can comprise determining communication augmentation information based on the sensor data from 820. Communication augmentation can comprise selection, modification, and adaptation, of a communication modality of a communication session. A context can be determined based on the sensor data. The context can be employed in selecting, ranking, scoring, or sorting a communication modality. This can result in preferred communication modalities. Further, the communication augmentation information can comprise sensor data that can be communicated to another device in conjunction with identifying one or more preferred communication modalities.

At 850, method 800 can comprise enabling access to the communication augmentation information and location information, such as by a service interface device via a communication framework. The communication augmentation information can comprise one or more preferred communication modalities that can be filtered or compared against available communication modalities of the service interface. This can result in initiation of a communication session based on one to the communication modalities supported and preferred by both the requestor and the service interface device.

At 860, method 800 can comprise facilitating communication with a remote device based on confirmation of communication augmentation via a service interface component. The service interface component can indicate an confirmation of an acceptable communication modality related to the remote device and the communication augmentation information of 850. Where the preferred communication modality is selected, a confirmation can be sent in reply. Where the preferred modality is not supported or otherwise unacceptable, a next modality can be selected, and a confirmation of acceptance of this next modality can be returned. Where no modality is acceptable, notice of failure and/or a list of acceptable modalities can be returned and method 800 can end.

At 870, method 800 can comprise facilitating communication with another UE based on another confirmation of communication augmentation via the other UE based on the communication augmentation. At this point method 800 can end. The other UE can be distinct from the service interface component, the remote device, and the first UE. As an example, an emergency services department can include a service interface component that is part of the same phone system used by operators to answer calls routed to them. The operators of the example can communicate via a remote device, e.g., a phone of the emergency services department. Method 800 can further enable communication with another UE. Augmentation information can be employed by the other UE to determine compatibility with a determined mode of communication and/or negotiate other available modes of communication. As an example, where augmentation information indicates that SMS is preferred to voice and the other UE determines that both SMS and voice are available, the other UE can confirm that SMS mode is acceptable and voice is available as an alternative. The other UE can therefore facilitate communications in a determined modality, as indicated in augmentation information, or, where the determined modality is not supported, other modalities that can be selected based on a ranking of available modalities for the UE and those available via other the UE.

Moreover, additional context and/or sensor data can be communicated to the other UE as part of coupling to a CAC, such as audio, video, motion, location, orientation, acceleration, temperature, pressure, direction of travel, or other information associated with sensors of the UE or those in communication with the UE. Sensor information can therefore provide information such as health history, blood pressure, heart rate, blood oxygen saturation, carbon monoxide detection, smoke detection, ionized particle detection, gunshot triangulation, etc., via other sensors in communication with the UE and/or associated profiles, etc.

In an aspect, method 800 illustrate a communication session with multiple entities, e.g., service interface component and another UE. This multiple entity communication session can comprise different communication modalities among the different entities. In an aspect, this can be useful where more than one target is to be bound in a communication session. This can enable rapid convergence on communication modalities in an automated manner that facilitates the equipment being employed by each participating entity. This aspect can also prove useful in conditions where one entity is a service entity, in that the augmentation information for the service entity can rapidly traverse call trees to get a call to a relevant service representative.

Figure 9:
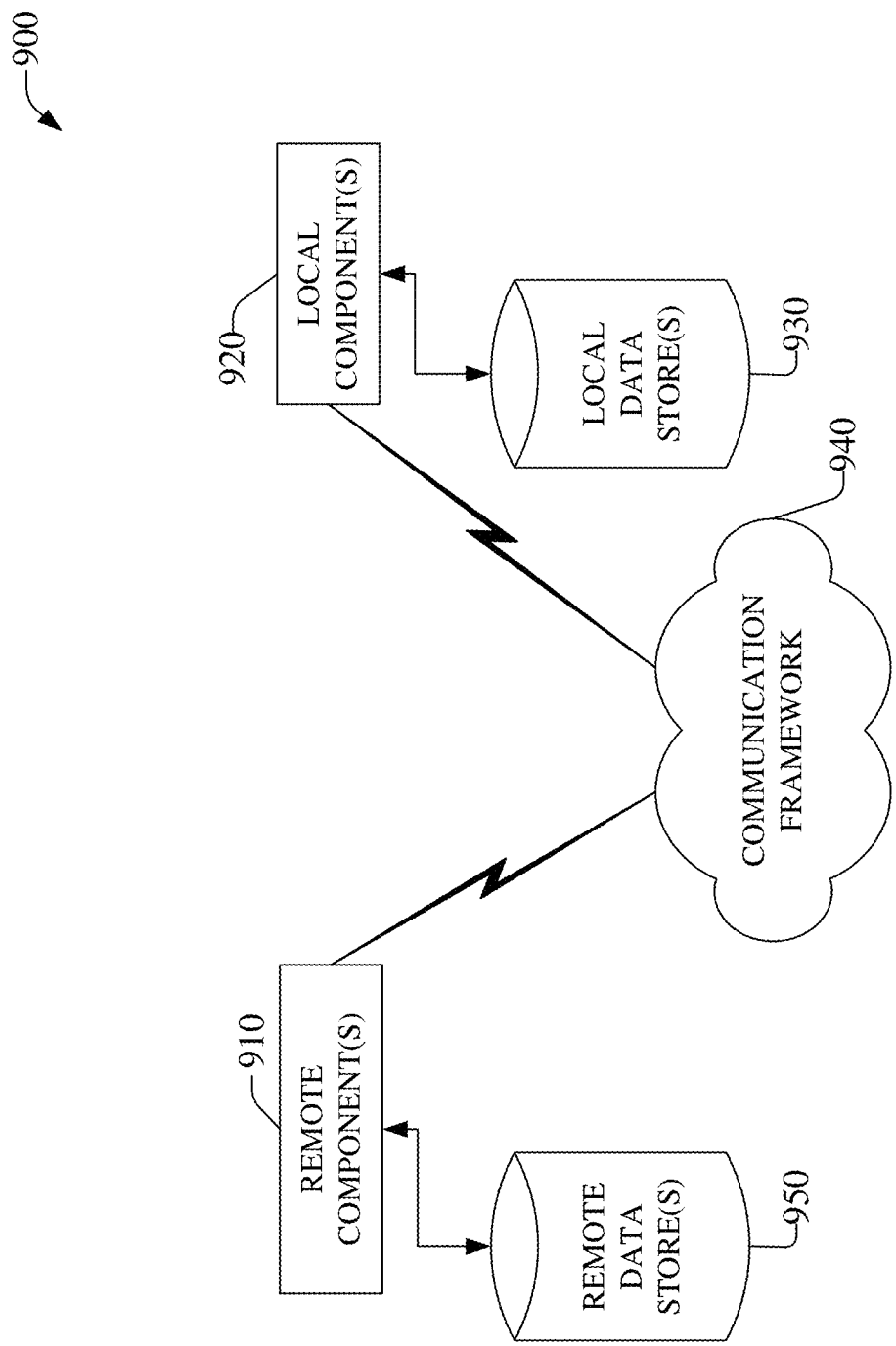
FIG. 9 depicts an example schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be service interface component 390, 492, 590, etc., other UE 494, etc., CAC 512-514, etc.

The system 900 also includes one or more local component(s) 920. The local component(s) 920 can be hardware and/or software (e.g., threads, processes, computing devices). In some embodiments, local component(s) 920 can include, for example, CAC 110-510, etc., UE 202, etc., CDC 730, etc., sensor component 522, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
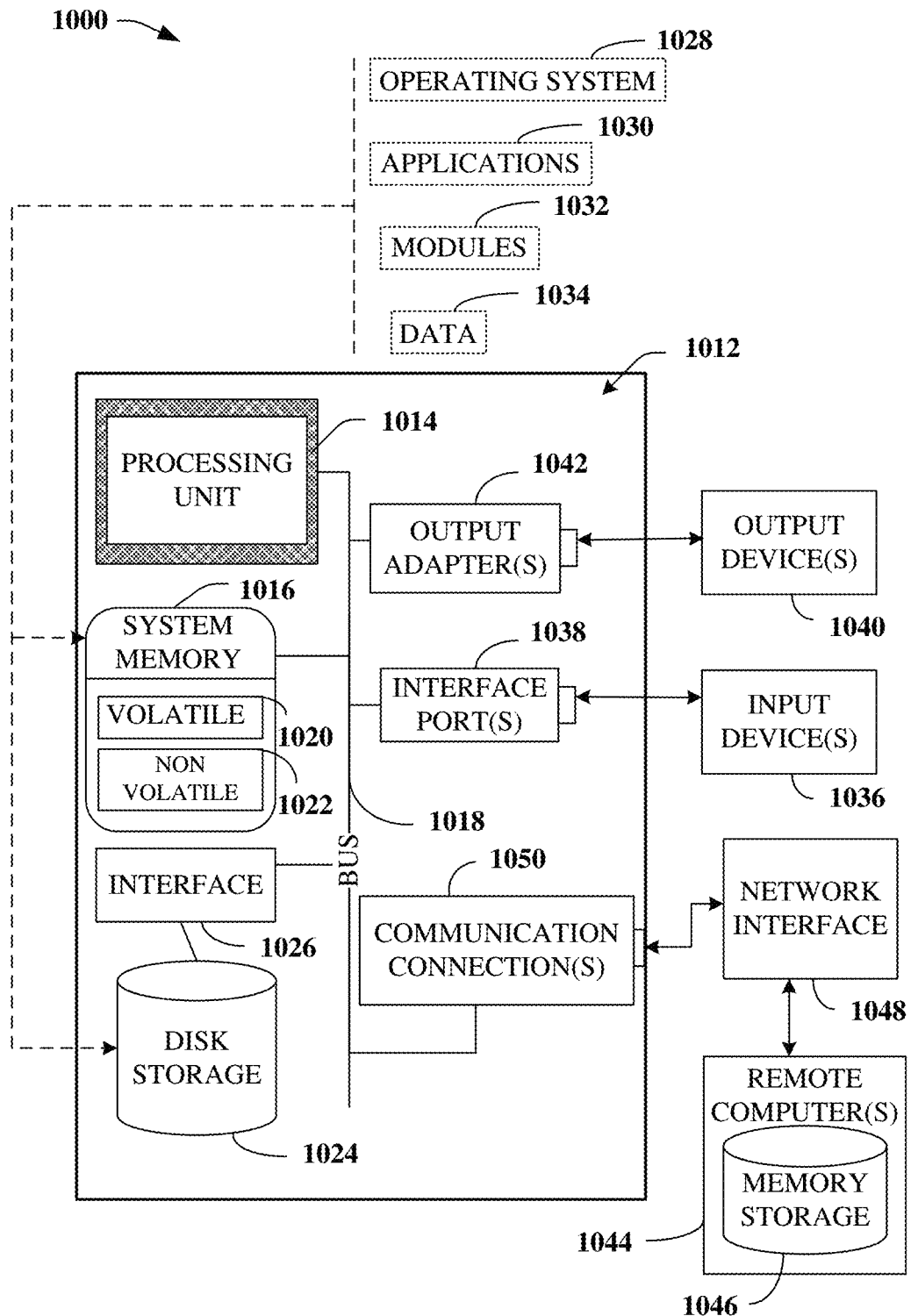
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of service interface component 390, 492, 590, etc., other UE 494, etc., CAC 110-510, 512-514, etc., UE 202, etc., CDC 730, etc., sensor component 522, etc. includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, UI Component 242 can receive touch, motion, audio, visual, or other types of input. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving environmental information related to an environment of a user equipment engaged in a communication session that is in-progress via a first communication modality for incoming communication and concurrently via a second communication modality for outgoing communication, wherein the environmental information is received via an external sensor;
ranking communication modalities based on a characteristic of the environment determined from the environmental information, wherein the communication modalities comprises the first communication modality, the second communication modality, and a third communication modality that is a different communication modality than the first communication modality and is a different communication modality than the second communication modality; and initiating adapting a first communication session based on the environmental information, wherein the adapting the communication session causes the communication session to further concurrently employ the third communication modality while the communication session remains in-progress.

2. The system of claim 1, wherein the initiating the adapting of the first communication session is in response to receiving an indication of an instance of a trigger event.

3. The system of claim 2, wherein the trigger event is a manual trigger event.

4. The system of claim 2, wherein the trigger event is an automatic trigger event.

5. The system of claim 1, wherein the environmental information comprises supplemental environmental information that is received from a sensor device other than the external sensor.

6. The system of claim 5, wherein the user equipment comprises the sensor device.

7. The system of claim 5, wherein the external sensor is a first external sensor, and wherein user equipment does not comprise the sensor device is a second external sensor that is a different external sensor than the first external sensor.

8. The system of claim 5, wherein the sensor device captures location data related to a location of the user equipment.

9. The system of claim 5, wherein the sensor device captures audio data related to an audio environment of the user equipment.

10. The system of claim 5, wherein the sensor device captures image data related to an imaging environment of the user equipment.

11. The system of claim 5, wherein the sensor device captures radio frequency data related to a radio frequency environment of the user equipment.

12. The system of claim 5, wherein the sensor device captures motion data related to a movement of the user equipment in the environment.

13. A method, comprising:
in response to receiving environmental information related to an environment of a user equipment engaged in an active communication session via a first communication modality for incoming and outgoing communication, ranking, by a system comprising a processor, communication modalities based on a characteristic of the environment determined from the environmental information, wherein the communication modalities comprise the first communication modality and a second communication modality that is a different communication modality than the first communication modality, and wherein the environmental information is received via an external sensor; and
indicating, by the system, the second communication modality based on rankings resulting from the ranking of the communication modalities, wherein the indicating the second communication modality facilitates the user equipment in adapting the active communication session to concurrently employ the second communication modality and the first communication modality while the active communication session remains active, wherein the concurrently employing the second communication modality and the first communication modality does not comprise transcoding communication data between the first communication modality and the second communication modality.

14. The method of claim 13, wherein the indicating the second communication modality is in response to an input from an entity engaged in the active communication session.

15. The method of claim 13, wherein the indicating the second communication modality is in response to a machine input resulting from determining that the characteristic of the environment satisfies a trigger condition.

16. The method of claim 15, wherein the indicating is received from a device located remotely from the user equipment.

17. A non-transitory machine-readable medium, comprising executable instructions that, when executed by a processor, facilitates performance of operations, comprising:
receiving environmental information related to an environment of a user equipment engaged in an active communication session via a first communication modality for incoming and outgoing communication, wherein the environmental information is received via an external sensor;
sorting communication modalities based on a characteristic of the environment determined from the environmental information, wherein the communication modalities comprise the first communication modality and a second communication modality that is a different communication modality than the first communication modality; and
facilitating adapting the active communication session to employ both the first communication modality and the second communication modality during the active communication, wherein the active communication session remains active, wherein the facilitating of the adapting is based on the sorting of the communication modalities, and wherein the employing both the first communication modality and the second communication modality excludes adapting first communication data received via the first communication modality into second communication data delivered according to the second communication modality.

18. The non-transitory machine-readable medium of claim 17, wherein the facilitating the adapting of the active communication session is in response to receiving an indication of an instance of a trigger event.

19. The non-transitory machine-readable medium of claim 18, wherein the instance of the trigger event is a manual trigger event.

20. The non-transitory machine-readable medium of claim 18, wherein the instance of the trigger event is an automatic trigger event.

* * * * *